(12) United States Patent
Enomura et al.

(10) Patent No.: US 11,439,973 B2
(45) Date of Patent: Sep. 13, 2022

(54) IMMEDIATELY-BEFORE-STIRRING-TYPE FLUID PROCESSING DEVICE AND PROCESSING METHOD

(71) Applicant: M. TECHNIQUE CO., LTD., Izumi (JP)

(72) Inventors: Masakazu Enomura, Izumi (JP); Kaeko Araki, Izumi (JP)

(73) Assignee: M. TECHNIQUE CO., LTD., Izumi (JP)

(*) Notice: Subject to any disclaimer, the term of this patent is extended or adjusted under 35 U.S.C. 154(b) by 757 days.

(21) Appl. No.: 16/338,586

(22) PCT Filed: Oct. 12, 2016

(86) PCT No.: PCT/JP2016/080278
§ 371 (c)(1),
(2) Date: Apr. 1, 2019

(87) PCT Pub. No.: WO2018/069997
PCT Pub. Date: Apr. 19, 2018

(65) Prior Publication Data
US 2020/0038821 A1 Feb. 6, 2020

(51) Int. Cl.
*B01J 19/18* (2006.01)
*B01F 27/93* (2022.01)
(Continued)

(52) U.S. Cl.
CPC .......... *B01J 19/1887* (2013.01); *B01F 23/231* (2022.01); *B01F 23/2331* (2022.01);
(Continued)

(58) Field of Classification Search
CPC .......... B01J 19/1887; B01J 2219/00779; B01F 27/93; B01F 27/41; B01F 27/411
See application file for complete search history.

(56) References Cited

U.S. PATENT DOCUMENTS

| | | |
|---|---|---|
| 2010/0110824 A1 | 5/2010 | Hirata et al. |
| 2010/0155310 A1 | 6/2010 | Enomura |
| (Continued) | | |

FOREIGN PATENT DOCUMENTS

| | | |
|---|---|---|
| JP | 2004-049957 A | 2/2004 |
| JP | 2009-082902 A | 4/2009 |
| (Continued) | | |

OTHER PUBLICATIONS

International Search Report (PCT/ISA/210) issued in PCT/JP2016/080278, dated Dec. 20, 2016.

*Primary Examiner* — Lessanework Seifu
(74) *Attorney, Agent, or Firm* — Birch, Stewart, Kolasch & Birch, LLP

(57) ABSTRACT

Provided are an immediately-before-stirring-type fluid processing device and an immediately-before-stirring-type fluid processing method that can adjust or improve the final properties of a fluid to be processed that is introduced as a raw material into an annular flow channel of a microreactor employing the annular flow channel, which is formed between relatively rotating processing surfaces, as a flow channel in which fluid processing is performed. A fluid to be processed, which has been prepared in a fluid preparing system so as to be in an ideal state for reaction, is charged into a fluid processing device. The fluid processing device subjects the fluid to be processed to reaction processing in an annular flow channel, which is formed between two processing surfaces. A cylindrical stirring space is provided in the radially inner side of the annular flow channel, and a rotor and a screen are disposed inside the stirring space. Stirring energy is applied by the rotor and a shearing force is applied between the rotor and the screen to the fluid to be processed immediately before the fluid to be processed is introduced into the annular flow channel.

20 Claims, 7 Drawing Sheets

(51) Int. Cl.
  *B01F 23/231* (2022.01)
  *B01F 23/233* (2022.01)
  *B01F 23/41* (2022.01)

(52) U.S. Cl.
  CPC .............. *B01F 27/93* (2022.01); *B01F 23/41* (2022.01); *B01J 2219/00779* (2013.01)

(56) References Cited

U.S. PATENT DOCUMENTS

2014/0001663 A1   1/2014   Kuraki et al.
2014/0072502 A1   3/2014   Enomura

FOREIGN PATENT DOCUMENTS

| | | |
|---|---|---|
| JP | 2009-214056 A | 9/2009 |
| JP | 2009-255083 A | 11/2009 |
| JP | 2011-056436 A | 3/2011 |
| JP | 2011-092941 A | 5/2011 |
| JP | 2012-228666 A | 11/2012 |
| WO | WO 2008/143056 A1 | 11/2008 |
| WO | WO 2012/128273 A1 | 9/2012 |
| WO | WO 2012/164652 A1 | 12/2012 |

(A)

(B)

IMMEDIATELY-BEFORE-STIRRING-TYPE FLUID PROCESSING DEVICE AND PROCESSING METHOD

TECHNICAL FIELD

The present invention relates to an improvement of a microreactor, especially to an improvement of a microreactor employing a circular flow path formed between processing surfaces which rotate relative to each other, the circular flow path being used as the flow path in which fluid processing is carried out in the microreactor.

BACKGROUND ART

A microreactor is an apparatus in which a chemical reaction, a stirring operation, or the like is carried out in the space of 1 mm or less in each side, wherein many of them use a microchannel. Since about 20 years ago, this has been researched and developed in the field of a microprocess engineering; and recently, this is used also as an actual production apparatus. The microreactor is not a so-called batch-type reaction apparatus using a large tank or the like, but it is a continuous-type reaction apparatus, which is superior in an energy efficiency, a reaction rate, a yield, a safety, and the like to the batch-type apparatus in which a reaction is carried out in a larger scale (Patent Document 1).

However, because scaling-up of the microreactor is difficult, this is used in actual production with a numbering-up method, namely, by connecting small-type microreactors as many as necessary. However, because generally the microreactor uses a microchannel, the use thereof is difficult in a reaction accompanied with separation of solid or generation of a gas, a fluid processing to a highly viscous substance to be processed, and the like; and thus, there is a problem that the choice of the substance to be processed is limited (Patent Documents 2 and 3).

In order to solve these problems, recently the apparatus as described in Patent Document 4 has been frequently used. This is the apparatus provided with at least two processing surfaces which rotate relative to each other, wherein the two processing surfaces are disposed so as to be able to approach to or separate from each other in the axial direction of the rotation. The clearance between the two processing surfaces is kept very narrow, and at least two fluids to be processed are introduced into this very narrow clearance that is kept between the two processing surfaces thereby forming a forced thin film; and by mixing, stirring, or carrying out a reaction in this forced thin film, not only this apparatus can be used even in a reaction accompanied with solid separation, gas generation, or the like, or in processing of a highly viscous substance to be processed, but also a targeted uniform substance can be obtained.

This apparatus is characterized by that the fluid to be processed that is applied with a pressure by a fluid pressure imparting mechanism is made to pass through a circular flow path formed between the processing surfaces which are disposed in a position they are faced with each other so that the fluid to be processed is processed under the state of the thin film fluid having the thickness of, for example, 1 mm or less.

This apparatus may be used in a fluid processing method in which one fluid is passed as the fluid to be processed from inside to outside the circular flow path thereby forming the thin film fluid by one fluid so as to carry out the processing, as well as in a fluid processing method in which the thin film fluid is formed by plural fluids so as to carry out the processing. In the case where plural fluids (for example, a first fluid and a second fluid) are used, the first fluid is passed from inside to outside the circular flow path to form the thin fil fluid by the first fluid, and the second fluid is fed from the midway of the circular flow path so as to join the second fluid to the thin film fluid by the first fluid, whereby the processing is carried out under the state of the thin film fluid by the two fluids as the fluids to be processed. At this time, it is considered advantageous to join the first fluid to the second fluid under a laminar flow condition in order to realize homogeneous mixing by molecular diffusion in the thin film fluid.

In the fluid processing process using the fluid processing apparatus of Patent Document 4, the fluids to be processed are processed in the thin film fluid; and thus, the property of the fluids to be processed has a large effect to the result of the fluid processing. More specifically, the dissolution state and dispersion state of the fluids to be processed, i.e., the first fluid, the second fluid, and so forth, can have a large effect thereto, so that it is important to introduce the fluids to be processed into between the processing surfaces under the state that the fluids to be processed are homogeneously dissolved or dispersed in a molecular level or in a cluster level.

In addition, the temperature condition of the fluids to be processed is one factor to determine the reaction condition in the thin film fluid; and thus, it is important to introduce the fluids to be processed into between the processing surfaces under the state of the prescribed temperature thereof.

Therefore, in Patent Document 5, it is proposed that homogeneous microparticles can be separated from the fluid to be processed by controlling the dissolution state or the dispersion state of the first and second fluids by using ultrasonic waves or a high-speed stirrer.

However, it is difficult to control precisely two conditions, the dissolution and dispersion condition and the temperature condition, of the fluids to be processed which are immediately before being introduced into between the processing surfaces.

In the case where the microreactor described in Patent Documents 4 and 5 is used, it is a general practice that after raw materials of the fluids to be processed such as the first fluid, the second fluid, and so forth are mixed or dissolved, they are sent to inside the microreactor apparatus via a first heat-exchanger, a second heat-exchanger, and so forth in order to adjust the temperature conditions thereof; and then, they are introduced into between the processing surfaces via the respective flow paths that are arranged in the apparatus.

As a result of it, at the time of dissolving the raw material, even if the fluid to be processed is prepared in an ideal state by using the ultrasonic waves or a high-speed stirrer, the fluid to be processed after being prepared passes via a heat-exchanger, so that at the time when it arrives at the circular flow path in which the reaction takes place, there is a case that separation or heterogenisation of the raw material takes place. In this case, there has been a problem that the raw material cannot be introduced into between the processing surfaces due to clogging of the path, or that this causes the state that the thin film fluid is unstable.

In addition, when a water-soluble polymer or the like is used in the first fluid or the second fluid, there is a case that use of ultrasonic waves or the high-speed stirrer is not suitable because this causes decrease in the molecular weight of the polymer or inclusion of fine air bubbles thereinto.

On the other hand, the fluid processing apparatus described in Patent Document 6 and Patent Document 7, which is the divisional application of Patent Document 6, has been known, wherein a large shear force is applied to the fluid to be processed so as to mix and disperse the fluid by means of the shear force thereby applied. The apparatus described in Patent Documents 6 and 7 also carries out the fluid processing between the two processing surfaces which rotate relative to each other, similarly to the fluid processing apparatus described in Patent Document 4; but the basic technological concepts are totally different between these two.

Specifically, in the fluid processing apparatus described in Patent Documents 6 and 7, the fluid to be processed is mixed, emulsified, and dispersed by applying a large shear force to the fluid to be processed, the shear force being generated by rotating the two processing surfaces relative to each other. This apparatus can also be used for production of microparticles. In this apparatus, a large physical energy generated by high-speed rotation, for example, at about 8000 rpm to about 12000 rpm, is applied to particles in the fluid to be processed so as to micronize the particles to obtain the microparticles thereof. Therefore, the fluid processing apparatus described in Patent Documents 6 and 7 does not presuppose a chemical reaction, so that this is not the apparatus to be used as a microreactor.

On the contrary, in the fluid processing apparatus described in Patent Documents 4 and 5, the fluid to be processed passing through the circular flow path formed between the two processing surfaces which rotate relative to the other in a comparatively low speed, for example, at about 200 rpm to about 2000 rpm, is mixed to give the thin film fluid; and thus, this apparatus is a microreactor in which the fluid to be processed is mixed so as to cause a chemical reaction in this thin film fluid.

In the fluid processing apparatus described in Patent documents 4 and 5, it is considered that the treatment such as mixing or reaction is carried out preferably under a laminar flow condition. Under this laminar flow condition, uniform mixing by molecular diffusion is realized, resulting in realization of a homogeneous reaction, thereby forming uniform microparticles when this is accompanied with separation. Namely, in order to obtain this laminar flow condition, the processing surfaces are rotated at a comparatively slow speed; and thus, when the processing surfaces are rotated at a high speed as in the apparatus that is described in Patent Documents 6 and 7, the fluid becomes a turbulent flow, so that not only the mixing by the molecular diffusion cannot be carried out but also reactants contact with each other randomly, thereby resulting in separation of non-uniform microparticles.

Next, in Patent Documents 6 and 7, it is also described that before carrying out mixing, emulsification, and dispersion by applying a high stirring energy to the fluid to be processed between the processing surfaces, a preliminary mixing is carried out by disposing a stirring blade in the apparatus.

However, the stirring blade, too, rotates at a high speed together with the processing surfaces thereby giving the stirring energy by the high speed stirring to the fluid to be processed. For example, in the paragraph 0041 of the specification of Patent Document 6, it is described that the stirring blade is disposed in the first holder which supports one processing surfaces such that it is supported so as to be rotatable to the first holder, so that the stirring blade rotates to the first holder by receiving the feeding pressure of the fluid to be processed, and thereby preliminary dispersion of the fluid to be processed is carried out before the processing between the processing surfaces.

Accordingly, in the apparatus described in Patent Documents 6 and 7, before mixing, emulsification, and dispersion are carried out between the processing surfaces which rotate at a high rotation speed, a preliminary mixing is carried out using the high rotation speed by the stirring blade that is disposed in the apparatus. In other words, the technology disclosed is that physical treatments of the preliminary stirring treatment and the main stirring treatment are carried out in a single apparatus at the high rotation speed in the both treatments.

On the other hand, in the apparatus according to Patent Document 4, because of the microreactor, in order to control the reaction condition, the fluid to be processed that is fed to the apparatus needs to be in the state of having been completely prepared. Therefore, it has been dominantly considered that the change in the property of the fluid in the apparatus can cause an adverse effect to the homogeneity of the reaction condition.

In addition, even if the stirring blade of Patent Document 6 were used in the apparatus of Patent Document 4, the apparatus of Patent Document 4 is a microreactor which rotates at a comparatively low rotation speed as mentioned before; and thus, even if the stirring blade were added to the rotating body such as the one which rotates at a comparatively low speed, a sufficient shear force could not be given to the fluid to be processed.

Moreover, because in Patent Document 4 it is indicated that the rotation speed of the processing surfaces can influence the particle diameter of the microparticles obtained by the separation reaction (paragraphs 0269, 0350, 0418, 0458, etc., of the specification of this Document), it is clear that the rotation speed thereof can significantly influence the reaction process in the circular flow path. Therefore, in order to separate the microparticles having a target particle diameter, it is necessary to change the reaction condition by changing the rotation speed of the processing surfaces.

It must be noted here that when the stirring blade of Patent Document 6 is used in the apparatus of Patent Document 4, the stirring blade rotates with the processing surfaces. Namely, the rotation speed of the stirring blade and the shear force generated therefrom cannot be changed independently against the rotation speed of the processing surfaces, the rotation speed being required from the view point of the reaction condition.

Therefore, when the rotation speed of the processing surfaces is changed in order to separate the microparticles having a target particle diameter, with this change the rotation speed of the stirring blade and the shear force generated therefrom change as well. As a result of it, the property of the fluid to be processed that is introduced into the circular flow path changes so that the control for separation of the microparticles having a target particle diameter is very much complicated.

CITATION LIST

Patent Documents

Patent Document 1: Japanese Patent Laid-Open Publication No. 2009-214056
Patent Document 2: Japanese Patent Laid-Open Publication No. 2012-228666
Patent Document 3: Japanese Patent Laid-Open Publication No. 2009-255083
Patent Document 4: Japanese Patent Laid-Open Publication No. 2009-082902

Patent Document 5: International Patent Laid-Open Publication No. 2012/128273
Patent Document 6: Japanese Patent Laid-Open Publication No. 2004-049957
Patent Document 7: Japanese Patent Laid-Open Publication No. 2011-092941

DISCLOSURE OF INVENTION

Problems to be Solved by the Invention

The present invention intends to provide an immediately-before-stirring-type fluid processing apparatus and an immediately-before-stirring-type fluid processing method with which properties of a fluid to be processed which is introduced as a raw material into a circular flow path of a microreactor employing it as a flow path in which fluid processing is carried out can be finally adjusted and improved, the circular flow path being defined by between processing surfaces which rotate relative to each other.

Means for Solving the Problems

The present invention provides an apparatus with which final stirring, dispersion, or the like of a raw material itself to be fed to a microreactor for a reaction can be carried out in the same apparatus as the microreactor.

Namely, the present invention relates to a fluid processing apparatus, wherein the apparatus is provided with: at least two processing surfaces which are disposed in a position they are faced with each other, and a rotating mechanism which relatively rotates the two processing surfaces to each other; and the fluid processing apparatus is configured such that the at least two processing surfaces define a circular flow path through which a fluid to be processed passes, and that fluid processing of the fluid to be processed can be carried out between the at least two processing surfaces when the fluid to be processed under a state of being in a thin film fluid passes through the circular flow path from an inner side to an outer side in a radius direction thereof.

The fluid processing apparatus according to the present invention is provided with a cylindrical stirring space in an inner side of the circular flow path in a radius direction, and a stirring blade and a screen are disposed in this stirring space. Further, the apparatus is configured such that to the fluid to be processed which is immediately before being introduced into the circular flow path, a stirring energy is added by means of the stirring blade and at the same time a shear force be added between the stirring blade and the screen.

This apparatus may be equipped with a position adjusting mechanism with which a position of the screen to the stirring blade is made changeable in order to control the shear force to the fluid to be processed.

With regard to a relationship of the position between the screen and the stirring blade, the screen may be disposed outside of the stirring blade; however, it is preferable to be disposed inside thereof. Namely, from a viewpoint to efficiently give an energy to the fluid to be processed, it is preferable to configure the apparatus such that the stirring blade is disposed between the screen and an introduction port into the circulation flow path and that the fluid to be processed which is bestowed with the shear force between the screen and the stirring blade and also with the stirring energy by means of the stirring blade collides to the wall which defines the stirring space. At this time, it is suitable that both a clearance between the stirring blade and the screen and a clearance between the stirring blade and the wall are 1 mm or less; however, this does not preclude the value of more than 1 mm.

The screen may be carried out with various embodiments; for example, an embodiment may be carried out such that the screen is disposed concentrically with the stirring blade inside the stirring blade along a circumferential direction, and is provided with plural slits in the circumferential direction.

The immediately-before-stirring-type fluid processing apparatus of the present invention can be used as a microreactor, wherein it is preferably used especially as the apparatus which can make the fluid to be processed that passes through the circular flow path to cause a reaction in a thin film fluid formed under a laminar flow condition. At this time, a relative rotation number of the processing surfaces is suitable in the range of 200 to 6000 rpm, while more preferably in the range of 350 to 5000 rpm.

This can be used also as an apparatus in which the circular flow path thereof is provided with at least two introduction ports; one introduction port is open to the stirring space thereby introducing thereto a first fluid immediately after having been stirred by the stirring blade from inner side of the circular flow path; and another introduction port is open to a midway of the circular flow path thereby joining a second fluid to the first fluid which has been forced to a thin-film-like form by the processing surfaces so as to carry out the processing such as a reaction.

It is also preferable to control a distance between the processing surfaces by a balance between a pressure of the fluid to be processed which acts to a separating direction in an axial direction of a rotation of the rotating mechanism and a force applied so as to make the processing surfaces approach in the axial direction of the rotation.

The immediately-before-stirring-type fluid processing apparatus of the present invention may be carried out in such a way that the apparatus is provided with a cylindrical stirring space in an inner side of the circular flow path in a radius direction thereof, and with a stirring blade and an independent adjusting means in the stirring space.

The stirring blade rotates together with the processing surface. On the other hand, the independent adjusting means is disposed so as to be movable against the stirring blade. And, it is configured such that by movement of the independent adjusting means a stirring ability to the fluid to be processed in the stirring space may change independently to a rotation number of the processing surface.

As a typical example of the independent adjusting means, the screen may be cited; however, other than the screen, a means to adjust the flow rate to the stirring blade may be used. The stirring ability of the stirring blade changes with this flow rate adjustment so that the fluid processing capacity such as a stirring treatment added to the fluid immediately before a reaction treatment can be changed independently from the rotation number of the processing surface.

The present invention also provides a method for processing a fluid to be processed by using the immediately-before-stirring-type fluid processing apparatus as mentioned above.

At this time, it is preferable to introduce at least one fluid that constitutes the fluid to be processed directly into the circular flow path from the stirring space without passing through any other flow path after the fluid is subjected to the stirring treatment by the stirring blade. Further, it is preferable to introduce the at least one fluid that constitutes the fluid to be processed into the circular flow path within 1 second after the fluid is subjected to the stirring treatment with the stirring blade.

In addition, the present invention provides a fluid processing method wherein by using a fluid processing apparatus in which at least two processing surfaces that are disposed in a position they are faced with each other rotate relative to each other, a fluid to be processed is introduced into a circular flow path defined by the at least two processing surfaces, and the fluid to be processed that is made to a thin film fluid in between the at least two processing surfaces is made to pass through the circular flow path from an inside to an outside thereof in a radius direction thereby carrying out a reaction treatment in the thin film fluid; the method being provided with the following steps.

First, to the fluid to be processed that is before being introduced into the fluid processing apparatus, preliminary adjusting steps including a preparation treatment step to adjust a mixing and dissolution state thereof and a temperature adjusting step to adjust a temperature thereof are carried out. The fluid to be processed after having been subjected to the preliminary adjusting steps is introduced into the fluid processing apparatus, whereby before the reaction treatment is carried out in the fluid processing apparatus, an immediately-before stirring step is carried out.

In this immediately-before stirring step, a stirring blade is disposed in a cylindrical stirring space which is disposed in an inner side of the circular flow path in a radius direction thereof, and a stirring energy is given to the fluid to be processed by rotation thereof so as to carry out a stirring treatment to the fluid to be processed that is immediately before being introduced into the circular flow path. Then, the reaction treatment is carried out in the thin film fluid that is formed when the fluid to be processed is passing through between the at least two processing surfaces under a laminar flow condition.

The embodiment may be carried out by using at least two fluids of a first fluid and a second fluid as the fluid to be processed. The circular flow path is made to be provided with at least two introduction ports of a first introduction port and a second introduction port, wherein after the preliminary adjusting steps and the immediately-before stirring step are carried out to the first fluid, the first fluid is introduced into the circular flow path through the first introduction port which is open to the stirring space thereby forming a thin film form forced by the processing surfaces. The second fluid is introduced into between the processing surfaces through the second introduction port which is open to a midway of the circular flow path so as to join the second fluid to the first fluid having been made to the thin film form, so that mixing and reaction of the fluids to be processed can be carried out by molecular dispersion under the laminar flow condition.

Alternatively, a following embodiment is also suitable. Namely, the stirring blade is unpivotably fixed to a center of a holder which supports and rotates the processing surface, and thereby rotating the stirring blade and the processing surface at the same speed; and an outer circumferential edge of the stirring blade is made to have a length to an axial direction of rotation of the stirring blade, and is disposed with a clearance of 1 mm or less to a wall which defines an outer circumferential surface of the stirring space; and after a stirring energy is given to the fluid to be processed by the stirring blade, the fluid to be processed is made to collide to the wall.

Effects of the Invention

According to the present invention, the immediately-before-stirring-type fluid processing apparatus and the immediately-before-stirring-type fluid processing method can be provided in which by installing the stirring blade inside the processing surface member, homogeneity of the substance to be processed at the time of introducing the substance to be processed into between the processing surfaces can be improved so that the fluid thereof can be stably introduced into between the processing surfaces.

There is no restriction in the fluid to be processed; however, the present invention is particularly effective when a slurry having a solid body dispersed therein is processed. In addition, in the case where the fluid is fed to between the processing surfaces via a heat-exchanger, it can happen that the substance to be processed becomes inhomogeneous or re-separation due to the change in temperature; and thus, the present invention is effective for the fluid to be processed which includes the substance to be processed as mentioned above. In addition, the present invention is effective in a case where a polymer or an undissolved raw material clogs the introduction part.

In addition, there has been a case that a filter is disposed in a pipeline in order to prevent clogging due to the undissolved matters or to prevent adhesion or deposition in the introduction part, so that there have been problems such as a pressure rise when sending the fluid and a poor reproducibility due to the change in concentration of the substance to be processed. Because the stirring blade is disposed inside the processing surface member, installation of the filter is not necessary so that the flow rate can be easily controlled, and also adhesion or deposition in the introduction part can be reduced, thereby resulting in improvement in the reproducibility as well.

Because separation or ununiformity of the raw material can be totally avoided, not only clogging at the time of introduction can be avoided, but also the thin film fluid can be stabilized. Accordingly, a reaction can be carried out ideally.

In addition, because mixing can be performed immediately before the introduction part into between the processing surfaces, a step of preliminary mixing can be deleted even if this step has been absolutely necessary. In addition, in the case where the preliminary mixing generates a heat or causes decomposition or the like thereby forming harmful byproducts, because the substance to be processed can be instantaneously introduced into between the processing surfaces after it is mixed immediately before the introduction, a reaction product with a higher uniformity can be obtained.

In addition, even in the case where a strong shear force is wanted to be avoided at the time of mixing and stirring in view of the problem such as reduction in a molecular weight of the substance to be processed, because the processing apparatus has a mechanism to easily adjust the shear force only by moving the screen, the shear force can be easily adjusted in accordance with a purpose thereof.

Namely, by carrying out the embodiment in which the position adjusting mechanism with which a position of the screen is made changeable is disposed, the shear force in the immediately-before stirring treatment can be controlled independently from the rotation speed of the processing surface. As a result, at the time when the rotation speed of the processing surface is changed in order to separate the microparticles having a targeted particle diameter, even if the rotation speed of the stirring blade changes with this change, the shear force can be adjusted independently. Accordingly, various controls to achieve a targeted reaction condition or to obtain targeted microparticles can be carried out more readily.

This is a rough cross section drawing of the fluid processing apparatus used in the fluid processing method according to the embodiment of the present invention.

FIG. 2

(A): This is a rough plan view of the first processing surface of the fluid processing apparatus illustrated in FIG. 1. (B): This is an enlarged drawing of the essential part of the processing surface of the apparatus.

FIG. 3

(A): This is a cross section view of the second introduction part of the apparatus. (B): This is an enlarged drawing of the essential part of the processing surface in order to explain the second introduction part.

FIG. 4

These are enlarged cross section views of the essential part of the stirring space of the apparatus, wherein (A) is a cross section view of the state in which the screen is in a low position, and (B) is a cross section view of the state in which the screen is in a high position.

FIG. 5

This is an explanatory drawing of the screen and the stirring blades of the apparatus, wherein the screen is drawn as a perspective view from under the screen, and the stirring blades are drawn as a perspective view from above the stirring blades.

FIG. 6

This is a cross section view of the screen and the stirring blades of the apparatus.

FIG. 7

This is a cross section view of the screen and the stirring blades of other embodiment.

BEST MODE FOR CARRYING OUT THE INVENTION

Hereinafter, embodiments of the present invention will be explained on the basis of the drawings.

The fluid processing system of the present invention is provided with the fluid preparation system P and the fluid processing apparatus F.

The fluid preparation system P is the system in which the fluid to be processed that is fed to the fluid processing apparatus F, which is a microreactor, is prepared; and this system is provided with a preparation processing apparatus, a temperature adjusting apparatus, and a pressure imparting mechanism.

(With Regard to the Fluid Preparation System P)

Figure 1:
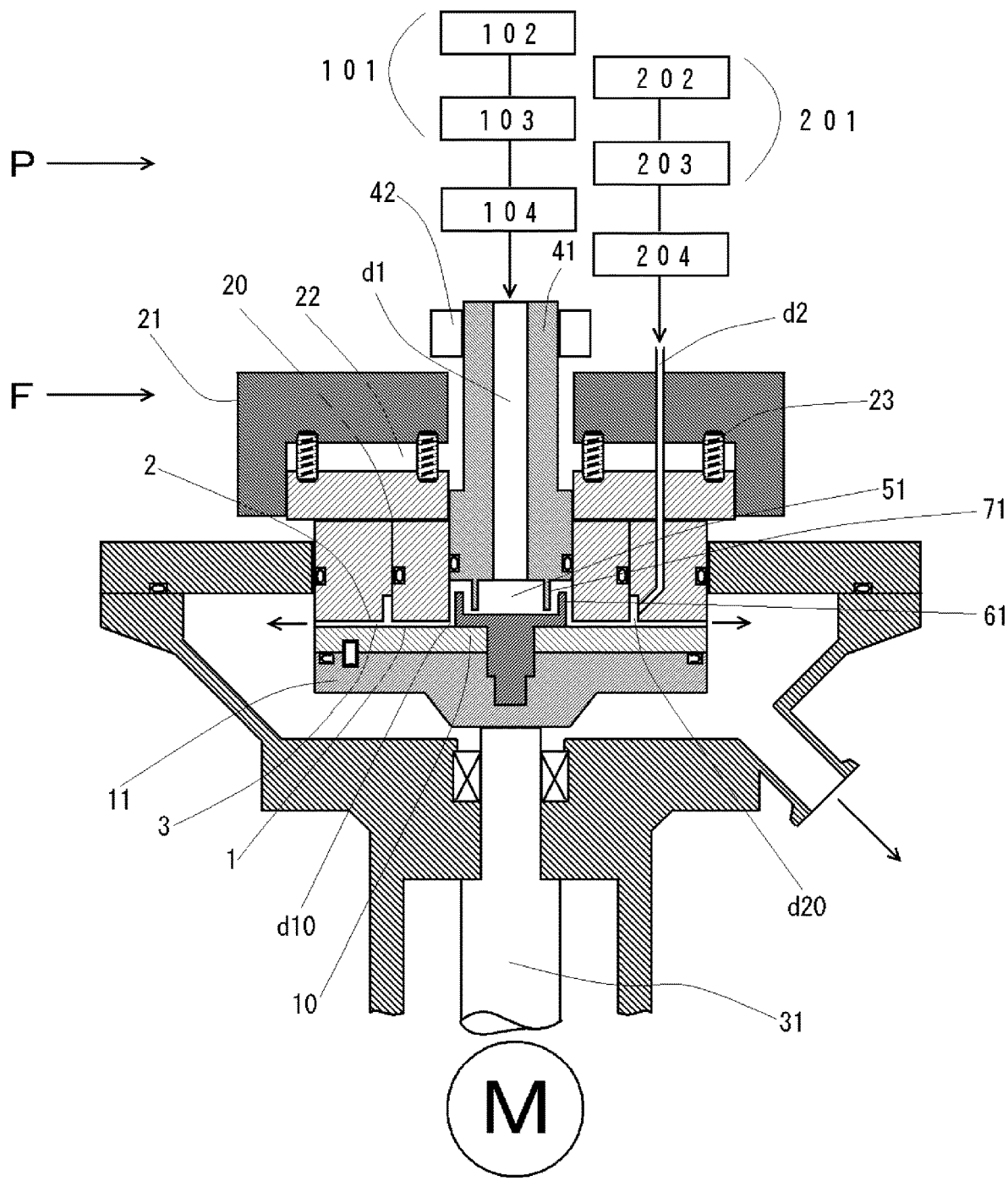
FIG. 1

In the embodiment depicted in FIG. 1, plural fluids (in this example, a first fluid and a second fluid are used, but fluids of a third fluid or more may be used as well) are fed to the fluid processing apparatus F so as to carry out the reaction treatment in the fluid processing apparatus F, wherein an optimal fluid to the reaction condition is prepared in the fluid preparation system P, and then the fluid is fed to the fluid processing apparatus F.

Specifically, in the fluid preparation system P, the first fluid and the second fluid are separately prepared, so that this system is provided with the first fluid preparation system 101 and the second fluid preparation system 201.

The first fluid preparation system 101 is provided with the first fluid preparation apparatus 102 and the first fluid temperature adjusting apparatus 103; and the first fluid which is prepared by these apparatuses is fed to the fluid processing apparatus F by means of the first fluid pressure imparting mechanism 104. The second fluid preparation system 201 is provided with the second fluid preparation apparatus 202 and the second fluid temperature adjusting apparatus 203; and the fluid which is prepared by these apparatuses is fed to the fluid processing apparatus F by means of the second fluid pressure imparting mechanism 204.

(With Regard to the Fluid Preparation Apparatuses)

The first fluid preparation apparatus 102 and the second fluid preparation apparatus 202 carries out the process such as mixing, stirring, dispersion, emulsification, reaction, or the like of each of the first fluid and the second fluid so as to blend the substances which constitute the fluid to be fed or to adjust the properties thereof. The first fluid temperature adjusting apparatus 103 and the second fluid temperature adjusting apparatus 203 each adjusts the temperature of each of the fluids which are obtained by the first fluid preparation apparatus 102 and the second fluid preparation apparatus 202 to be optimal for the reaction condition in the fluid processing apparatus F.

Specific example of the apparatus in the first fluid preparation apparatus 102 and the second fluid preparation apparatus 202 can include a stirring apparatus, a grinding apparatus, a shaking apparatus, and a reaction apparatus such as a reaction vessel, as well as auxiliary apparatuses which are necessary for carrying out the processes with these apparatuses. Specific example of the stirring apparatus can include a homogenizer and a magnetic stirrer, wherein illustrative example of the homogenizer can include, besides general homogenizers, Clearmix which is manufactured by the applicant of the present invention. The stirring may be carried out with any of a batch system or a continuous system. When the continuous system is used, feeding and discharging of the fluid to and from a stirring tank may be carried out continuously, or by using a continuous mixer without using the stirring tank.

(With Regard to the Temperature Adjusting Apparatuses)

With regard to the first fluid temperature adjusting apparatus 103 and the second fluid temperature adjusting apparatus 203, various apparatuses which can give a temperature energy to the fluid may be used. Specifically, a heat-exchanger with which a cooling action or a heating action can be given to the fluid may be cited.

Meanwhile, it should be understood that the first fluid temperature adjusting apparatus 103 and the second fluid temperature adjusting apparatus 203 are the apparatuses with which the final temperature conditions of the fluids to be processed that are fed to the fluid processing apparatus F are set. Therefore, for example, when the temperature change in the first fluid preparation apparatus 102 and the second fluid preparation apparatus 202 can be exactly predicted, they may be disposed in the upstream sides of or in the same positions as the first fluid preparation apparatus 102 and the second fluid preparation apparatus 202, or may be disposed as the auxiliary apparatuses thereof. Accordingly, it is understood that the first fluid preparation apparatus 102 and the second fluid preparation apparatus 202 are the systems in which all the treatments are carried out in order to adjust the final temperature conditions of the fluids to be fed to the fluid processing apparatus F. However, because it is suitable to carry out the adjustment of the final temperature conditions at the time immediately before the fluids are fed to the fluid processing apparatus F, it is suitable that the first fluid temperature adjusting apparatus 103 and the second fluid temperature adjusting apparatus 203 is disposed in the downstream sides of the first fluid preparation apparatus 102 and the second fluid preparation apparatus 202, respectively, and that the preparation processing steps to the first fluid and the second fluid respectively is carried out before the temperature adjusting steps.

(With Regard to the Pressure Imparting Mechanisms)

The fluids to be processed (in this example, they are the first fluid and the second fluid) after being subjected to these processes are fed to the fluid processing apparatus F by means of the first fluid pressure imparting mechanism 104 and the second fluid pressure imparting mechanism 204. With regard to the first fluid pressure imparting mechanism 104 and the second fluid pressure imparting mechanism 204, various pumps may be used. The first fluid pressure imparting mechanism 104 and the second fluid pressure imparting mechanism 204 may be disposed in the upstream side of the first fluid temperature adjusting apparatus 103 and the second fluid temperature adjusting apparatus 203, and further, in the upstream side of the first fluid preparation apparatus 102 and the second fluid preparation apparatus 202, provided that the fluids to be processed can be fed to the fluid processing apparatus F with prescribed pressures. In order to suppress pulsation during pumping, the pressure imparting mechanism equipped with a pressure vessel may also be employed. A pressurizing gas is introduced into the pressure vessel in which the fluid to be processed is stored; and by means of this pressure the fluid to be processed can be transferred by pressing out the fluid to be processed.

In order to retain the temperature conditions of the fluids to be processed (in this example, the first fluid and the second fluid) which are obtained by the first fluid preparation system 101 and the second fluid preparation system 201, it is also preferable to carry out the embodiment in which a temperature retaining equipment such as a temperature adjusting jacket is disposed in the pipeline till the fluid processing apparatus F.

(With Regard to the Fluid Processing Apparatus F)

The fluid processing apparatus F will be explained by referring to FIG. 1 to FIG. 6.

The part in which the reaction treatment is directly carried out in the fluid processing apparatus F illustrated in FIG. 1 to FIG. 6 is the same as that of the apparatus which is described in Patent Document 4. Specifically, the fluid to be processed is processed in the circular flow path formed between the processing surfaces in the processing members which are able to approach to and separate from each other, and at least one member rotates relative to the other member. The first fluid, which is the first fluid to be processed out of the fluids to be processed, is introduced into between the processing surfaces; and the second fluid, which is the second fluid to be processed out of the fluids to be processed, is introduced into between the processing surfaces from the different flow path, which is independent of the flow path through which the first fluid is introduced, and which is provided with an opening part to between the processing surfaces, so as to mix the first fluid with the second fluid in between the processing surfaces thereby continuously carrying out the reaction treatment. In other words, these fluids are converged to become the thin film fluid in the circular flow path formed between the disc-like processing surfaces which are disposed in a position they are faced with each other in an axial direction; therefore, this is the fluid processing apparatus in which the reaction treatment of the fluids to be processed is carried out in this thin film fluid. Meanwhile, this apparatus is optimal for processing of plural fluids to be processed; however, this can also be used to cause a reaction of a single fluid to be processed in the circular flow path.

In FIG. 1, the upper and lower relationship of the figure corresponds to that of the apparatus. In the present invention, however, the relationships between upper and lower, front and rear, and right and left merely indicate the relative positional relationships thereof, not indicating the absolute positions thereof. In FIG. 2(A) and FIG. 3(B), R indicates a rotational direction. In FIG. 3(B), C indicates a centrifugal direction (radius direction).

The fluid processing apparatus F according to the present invention is different from the apparatus described in Patent Document 4 in the point that the cylindrical space to feed the fluid to be processed (especially the first fluid) to the circular flow path is utilized as the stirring space. However, the circular flow path will be explained first, because in order to deeply understand the present invention it is important to explain the structure, action, and the like of the circular flow path as the reactor, the circular flow path being in common with the apparatus described in this prior art reference.

(With Regard to the Processing Surfaces)

The fluid processing apparatus F is provided with two processing members, the first and the second processing members 10 and 20, which are disposed in a position they are faced with each other, wherein at least one processing member rotates. The faces of the processing members 10 and 20 which are faced with each other serve as the respective processing surfaces. The first processing member 10 is provided with the first processing surface 1 and the second processing member 20 is provided with the second processing surface 2.

The processing surfaces 1 and 2 define the circular flow path 3. The circular flow path 3 is connected to the fluid preparation system P; and in it the fluids to be processed that are fed thereto from the first fluid preparation system 101 and the second fluid preparation system 201 of the fluid preparation system P are caused to react.

The distance between the processing surfaces 1 and 2 may be arbitrarily changed, wherein the distance is usually adjusted very narrow to 1 mm or less, for example, in the range of about 0.1 µm to about 50 µm. By so doing, the fluids to be processed that pass through between the processing surfaces 1 and 2 become a forced thin film fluid forced by the processing surfaces 1 and 2.

In the case where plural fluids to be processed including the first fluid and the second fluid are processed by using the fluid processing apparatus F, the fluid processing apparatus F is connected to the flow path of the first fluid, which is introduced into the circular flow path 3 defined by the processing surfaces 1 and 2 from the upstream end (in this example, from an inner side of the circle). With this, the circular flow path 3 forms part of the flow path of the second fluid, different from the first fluid. Then, both the fluids to be processed, i.e., the first fluid and the second fluid, are mixed in the circular flow path 3 between the processing surfaces 1 and 2 thereby carrying out the fluid processing such as a reaction.

To specifically explain, the fluid processing apparatus F is provided with the first holder 11 to hold the first processing member 10, the second holder 21 to hold the second processing member 20, the surface-contacting pressure imparting mechanism, the rotation drive mechanism M, the first introduction part d1, and the second introduction part d2. The first fluid and the second fluid are introduced into the circular flow path 3 under the state in which the pressures of these fluids are set to respective prescribed values by the first fluid pressure imparting mechanism 104 and the second fluid pressure imparting mechanism 204, wherein these mechanisms constitute the fluid pressure imparting mechanism.

As depicted in FIG. 2(A), in this embodiment, the first processing member 10 is a circular body, more specifically, a disc in the shape of a ring. The second processing member 20 is also a disc in the shape of a ring; however, this may be in the shape of a disc without having an opening in the center thereof, provided that the fluids to be processed including the first fluid and the second fluid can be introduced thereinto.

The first and second processing members 10 and 20 may be composed of a single member or a combination of plural members, wherein the construction material thereof may be a ceramic, a sintered metal, an abrasion-resistant steel, sapphire, a metal subjected to hardening treatment, or a hard material subjected to lining, coating, or plating treatment, besides a metal. In this embodiment, at least part of the first and second processing surfaces 1 and 2 is mirror-polished.

(With Regard to Rotation of the Processing Surfaces)

At least any one of the first holder 11 and the second holder 21 rotates relative to the other holder by the rotation driving mechanism M such as an electric motor. The driving axis of the rotation driving mechanism M is connected to the rotation axis 31; and in this embodiment, the first holder 11 attached to the rotation axis 31 rotates, and the first processing member 10 which is supported by the first holder 11 rotates relative to the second processing member 20. As a matter of fact, the second processing member 20 may be rotated, or the both may be rotated as well.

(With Regard to Approach and Separation of the Processing Surfaces)

At least any one of the first processing member 10 and the second processing member 20 is able to approach to and separate from at least any other processing member in the axial direction of the rotation axis 31, so that the processing surfaces 1 and 2 can approach to and separate from each other.

In this embodiment, the first processing member 10 is configured such that it is fixed in the axial direction but rotates in the circumferential direction. To this first processing member 10, the second processing member 20 approaches and separates in the axial direction, and the second processing member 20 is retractably stored in the storing member 22 which is disposed in the second holder 21.

Meanwhile, the second processing member 20 may be disposed in the storing member 22 of the second holder 21 such that it is movable in parallel to the axial direction; but it may also be stored with a large clearance, and the second processing member 20 may be held with a floating mechanism so as to be able to displace three-dimensionally.

(Movement of the Fluid to be Processed)

The fluids to be processed receive pressures by the fluid pressure imparting mechanisms including the first fluid imparting mechanism 104 which applies a pressure to the first fluid and the second fluid imparting mechanism 204 which applies a pressure to the second fluid. Under this pressurized state, the fluids to be processed including the first fluid and the second fluid are introduced into between the processing surfaces 1 and 2 through the first introduction part d1 and the second introduction part d2, respectively.

In this embodiment, the first introduction part d1 is a flow path which penetrates the central part 41 in an axial direction, the central part being in the center of the circular first holder 11; and the lower end thereof is connected to the cylindrical stirring space 51, wherein after the first fluid is subjected to an immediately-before stirring treatment with the rotor 61 disposed in the stirring space 51 and the screen 71 optionally disposed, it is introduced into between the processing surfaces 1 and 2 from an inner side of the circular flow path 3 in a radius direction thereof.

The second introduction part d2 is a flow path disposed in the second processing member 20, wherein one end thereof is open in the second processing surface 2, and this opening is the direct introduction opening (second introduction port d20) to the circular flow path 3. In this embodiment, the immediately-before stirring treatment is not carried out to the second fluid; however, similarly to the first fluid, introduction thereof into the circular flow path 3 may also be made after the immediately-before stirring treatment.

The first fluid is introduced into the circular flow path 3 from the first introduction part d1 through the clearance in the inner diameter side between the processing members 10 and 20 via the stirring space 51, wherein this clearance plays a role as the first introduction port d10. The first fluid that is introduced from the first introduction port d10 into the circular flow path 3 is made to a thin film fluid between the first processing surface 1 and the second processing surface 2, and then, it goes through toward an outer side of the processing members 10 and 20. The second fluid having been pressurized to a prescribed pressure is fed into between the processing surfaces 1 and 2 through the second introduction port d20 of the second introduction part d2, and then, it is joined therein to the first fluid having been made to the thin film fluid; and, while or after they are mixed with each other mainly with molecular dispersion, the reaction treatment is carried out. This reaction treatment may be accompanied with crystallization, separation, or the like, or may not be accompanied with them.

The thin film fluid formed from the first fluid and the second fluid is discharged from the processing surfaces 1 and 2 to outside the processing members 10 and 20 after the fluid processing including the reaction treatment is carried out. In this embodiment, the fluid to be processed after the reaction treatment is efficiently recovered and then discharged to outside the system by disposing an outer casing in outside the processing members 10 and 20; however, the outer casing may be disposed as needed.

Meanwhile, because the first processing member 10 rotates, the fluid to be processed in the circular flow path 3 does not move linearly from an inner side to an outer side thereof, but it moves from an inner side to an outer side almost spirally by action of a synthetic vector to the fluid to be processed, the synthetic vector being formed of the migration vector to a radius direction of a circle and the migration vector in a circumferential direction thereof.

(With Regard to the Pressure Balance)

Next, the surface-contacting pressure imparting mechanism to impart the force to the processing members thereby forcing the first processing surface 1 and the second processing surface 2 to approach with each other will be explained. In this embodiment, the surface-approaching pressure imparting mechanism is arranged in the second holder 21 and biases the second processing member 20 toward the first processing member 10. The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The surface-approaching pressure imparting mechanism generates a thin film fluid having minute thickness in a level of nanometer or micrometer by the balance between the surface-approaching pressure and the force to separate the processing surfaces 1 and 2 from each other, i.e., the force such as the fluid pressure which separates the processing surfaces 1 and 2 from each other. In other words, the distance between the processing surfaces 1 and 2 is kept in a predetermined minute distance by the balance between these forces.

In the embodiment shown in FIG. 1, the surface-approaching pressure imparting mechanism is arranged between the storing member 22 and the second processing member 20. Specifically, the surface-approaching pressure imparting mechanism is composed of a spring 23 to bias the second processing member 20 toward the first processing member 10 and a biasing-fluid introduction part (not shown) to introduce a biasing fluid such as air and oil, wherein the surface-approaching pressure is provided by the spring 23 and the fluid pressure of the biasing fluid. The surface-approaching pressure may be provided by any one of this spring 23 and the fluid pressure of this biasing fluid; and other forces such as magnetic force and gravitation may also be used.

The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 is set.

The first and second processing members 10 and 20 may be provided with the temperature adjusting mechanism in at least any one of them, whereby the temperature thereof may be adjusted by cooling or heating with the mechanism. The temperature energy possessed by the fluids to be processed including the temperature of cooling or heating by the first fluid temperature adjusting mechanism 103 and the second fluid temperature adjusting mechanism 203 may be used to separate the substance to be processed that is processed, or may be utilized to generate the Bernard conviction or the Marangoni convection in the fluid to be processed that is converted to the thin film fluid.

Figure 2:
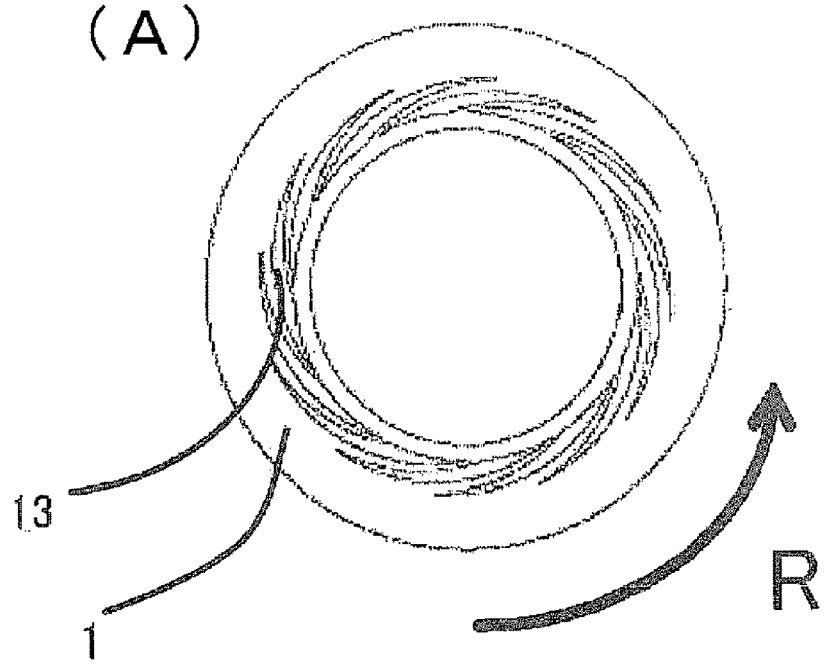
Figure 2:
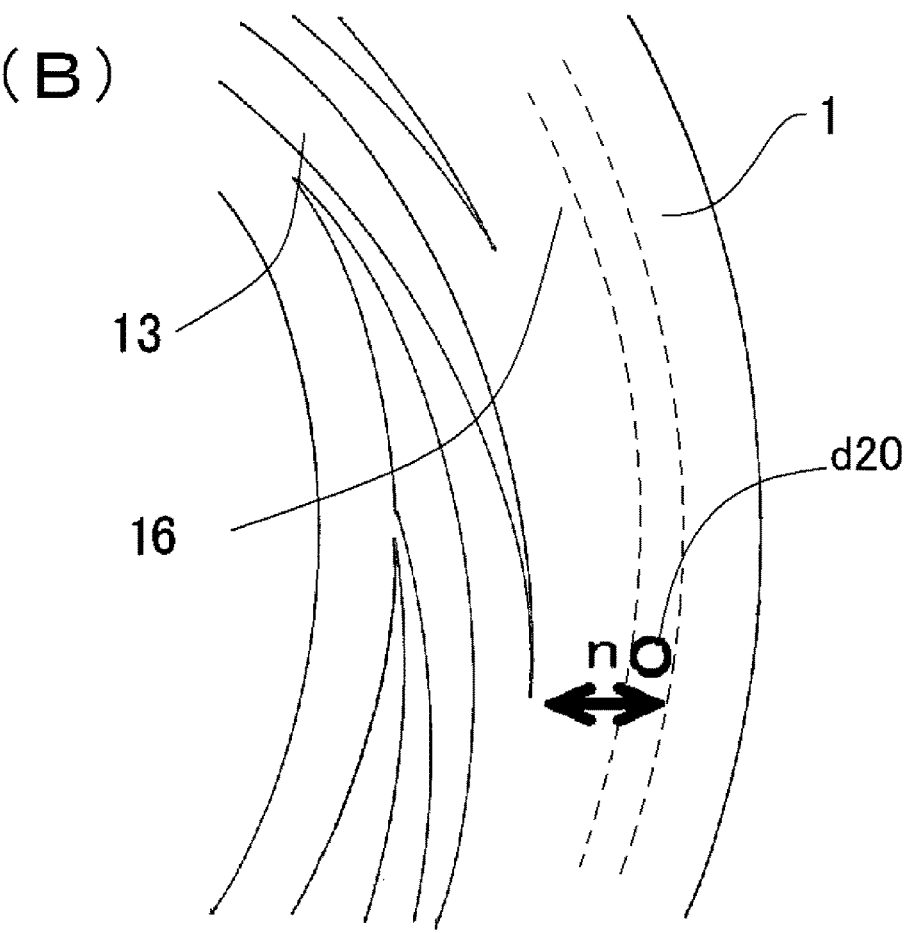
Figure 3:
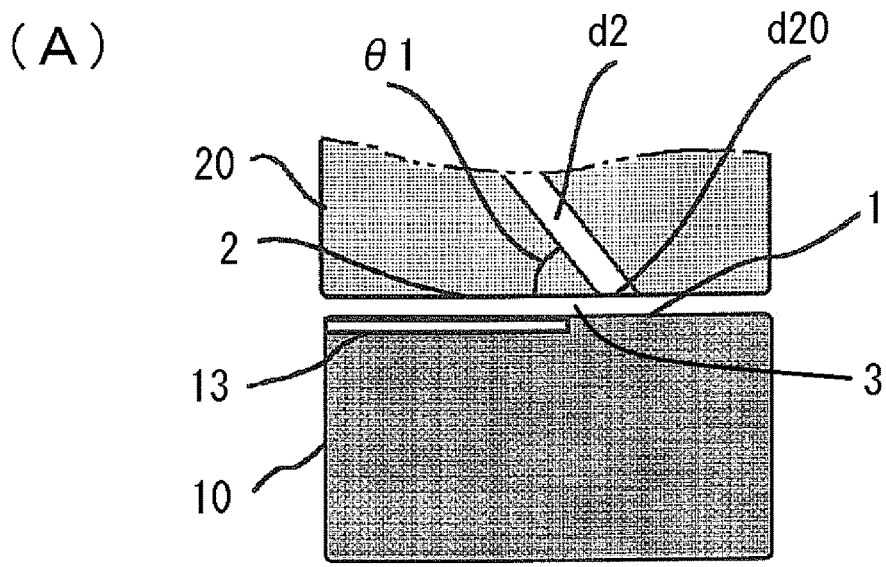
Figure 3:
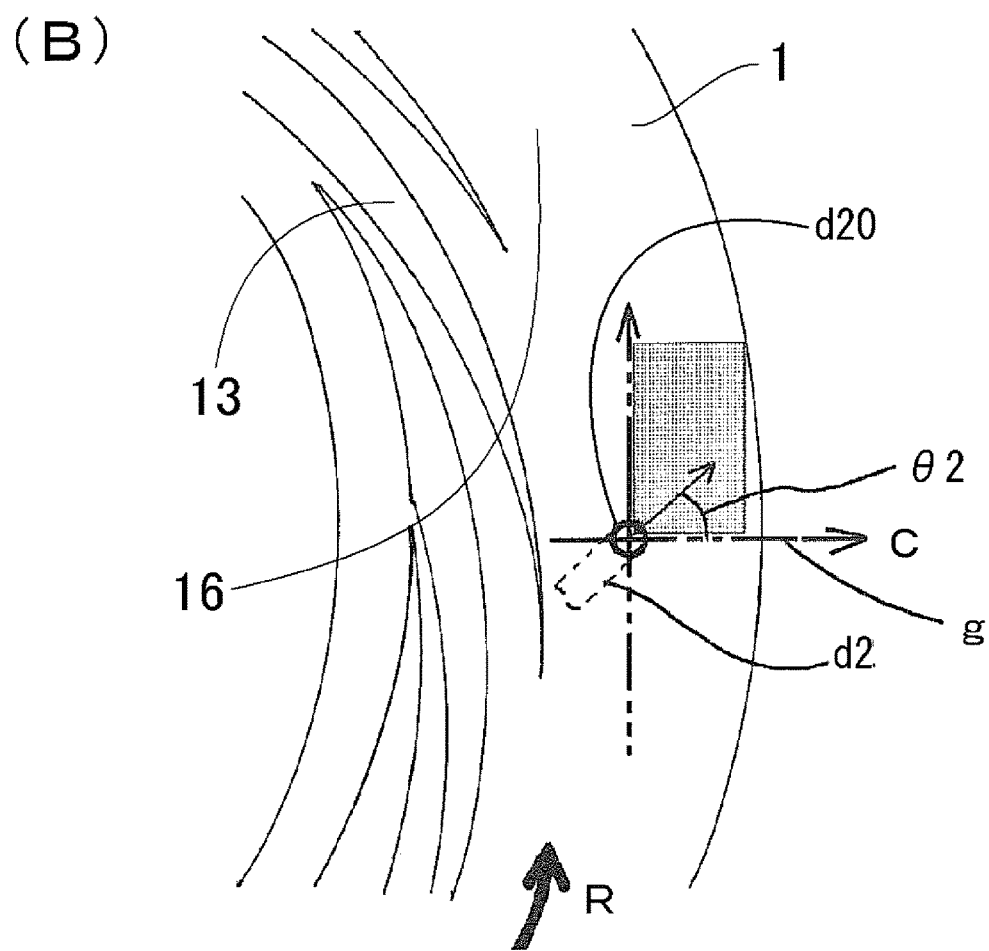

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed can be sucked into between the first and second processing surfaces 1 and 2.

It is desirable that the base end of this depression 13 reach the internal circumference of the first processing member 10. The front end of the depression 13 is extended toward the outer circumference side of the first processing surface 1, and the depth thereof (cross section area) becomes gradually shallower (smaller) as going from the base end to the front end.

Between the front end of the depression 13 and the outer circumference side of the first processing surface 1 is arranged the flat plane 16 not having the depression 13.

(With Regard to the Rotating Speed and Reaction of Fluids)

When the second introduction opening d20 of the second introduction part d2 is arranged in the second processing surface 2, the arrangement is done preferably at a position opposite to the flat surface 16 of the first processing surface 1 arranged at a position opposite thereto.

This second introduction opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing by molecular diffusion of a plurality of fluids to be processed and reaction and separation of the nanoparticles therefrom be effected under the condition of a laminar flow.

In order to process the fluid to be processed in the laminar flow condition as mentioned above, the rotation number of the first processing surface 1 is preferably in the range of 200 to 6000 rpm, while more preferably in the range of 350 to 5000 rpm (circumferential velocity in the outer circumference is in the range of 1.8 to 39.3 m/sec). In the fluid processing apparatus F as the microreactor of the present invention with which the fluid to be processed is caused to react, the rotation is sufficiently slower as compared to the rotation number of 8000 to 12000 rpm (circumferential velocity of 41.9 to 62.8 m/sec) in the processing surface of the refinement apparatus by a shear force as described in Patent Document 6. When the rotation speed is made to higher than this thereby resulting in the turbulent flow, for example, contact among the plural substances to be reacted that are included in the first fluid and the second fluid becomes random in between the processing surfaces 1 and 2, so that there is a risk that a homogeneous reaction or a uniform separation of the particles becomes difficult.

(With Regard to the Second Introduction Part)

The second introduction port d20 may be an independent opening having a circular shape or the like as depicted in FIG. 2(B) and FIG. 3(B), or may be continuous opening having a concentric circular shape or the like surrounding the central opening of the processing surface 2, which is the disc in the shape of a ring. In addition, in the case where the second introduction port d20 is made to a circular shape, the opening part thereof having the circular shape may be continuous around the entire circumference or partly discontinuous.

When the second introduction port d20 having the circular shape is disposed concentrically in the position surrounding the central opening of the processing surface 2, introduction of the second fluid into between the processing surfaces 1 and 2 can be made under the same condition in the circumferential direction. Accordingly, when mass production of microparticles is intended, the shape of the opening part is preferably a concentric circle.

The second introduction part d2 can be made to have directionality. For example, as depicted in FIG. 3(A), the introduction direction from the second introduction port d20 of the processing surface 2 is slanted to the second processing surface 2 with a prescribed elevation angle (θ1). The elevation angle (θ1) is set at more than 0 degree and less than 90 degrees, wherein in the case of the reaction with a fast reaction rate, the elevation angle is set at preferably 1 degree or more and 45 degrees or less.

In the case where the second introduction port d20 is an independent open hole as depicted in FIG. 3(B), it can also have directionality in the plane along the second processing surface 2. The introduction direction of the second fluid is an outside direction in the component of a radius direction of the processing surface so as to leave away from the center of the processing surface and a forward direction in the component of a rotation direction of the fluid in between the rotating processing surfaces. In other words, when the line segment going through the second introduction port d20 to the outside direction in the radius direction is taken as the base line g, there is a prescribed angle (θ2) from the base line g to the rotation direction R. This angle (θ2) is also set at preferably more than 0 degree and less than 90 degrees.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof. Further, the expression "first" or "second" for each fluid has a meaning for merely discriminating an $n^{th}$ fluid among a plurality of the fluids present; and therefore, a third or more fluids can also exist.

Meanwhile, each flow path is sealed, thereby the path is liquid-tight (when the fluid to be processed is a liquid) or air-tight (when the fluid to be processed is a gas).

(With Regard to the Immediately-Before Stirring)

Next, the immediately-before stirring, which is an essential part of the present invention, will be explained.

The fluid processing apparatus of the present invention is provided with the cylindrical stirring space 51 in an inner side of the circular flow path 3 in the radius direction. Inside the stirring space 51 are disposed the rotor 61 and the screen 71, whereby a stirring energy is given by the rotor 61 to the first fluid which is immediately before being introduced into the circular flow path 3 from the first introduction port d10. Alternatively, in addition to the rotor 61, the screen 71 can also be used so as to apply the shear force between them. With this immediately-before stirring, the fluid to be processed is mixed, dispersed, and stirred, wherein the most important task thereof is to bring the first fluid which was adjusted to the most ideal state by the first fluid preparation system 101 (especially the first fluid preparation apparatus 102) back to the state immediately after the preparation thereof, and then, this fluid is fed from the first introduction port d10 to the circular flow path 3. With regard to the temperature condition of the first fluid, after it is adjusted by the first fluid temperature adjusting apparatus 103, the temperature change can be suppressed by disposing the temperature adjusting jacket in the flow path till the fluid processing apparatus F. On the other hand, with regard to the change in the fluid properties, there is a possibility that the change takes place in the first fluid temperature adjusting apparatus 103 or in the flow path till the fluid processing apparatus F; however, there is no effective means to retain the state immediately after the preparation thereof. Therefore, by applying a stirring energy by means of the rotor 61 in the stirring space 51, which is disposed immediately before the first introduction port d10, the fluid is made close to the state immediately after the preparation thereby bringing the fluid to more suitable state, and then it is introduced into the circular flow path 3.

The stirring blade in Patent Document 6 is to disperse the substance to be processed for preliminary dispersion thereof; on the other hand, the immediately-before stirring of the present invention is for final stirring, dispersion, and the like of the raw material itself to the reaction; and thus, the present invention is intrinsically different from the above prior art in these points.

(With Regard to the Stirring Space)

Figure 4:
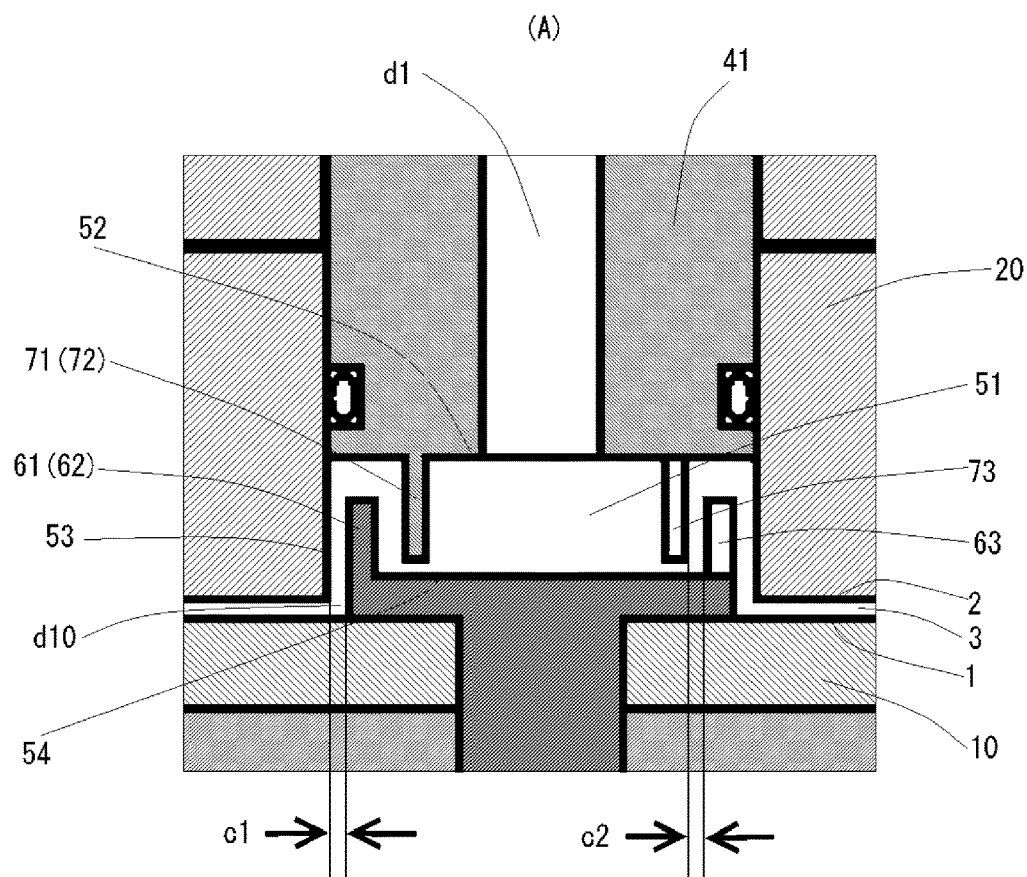
Figure 4:
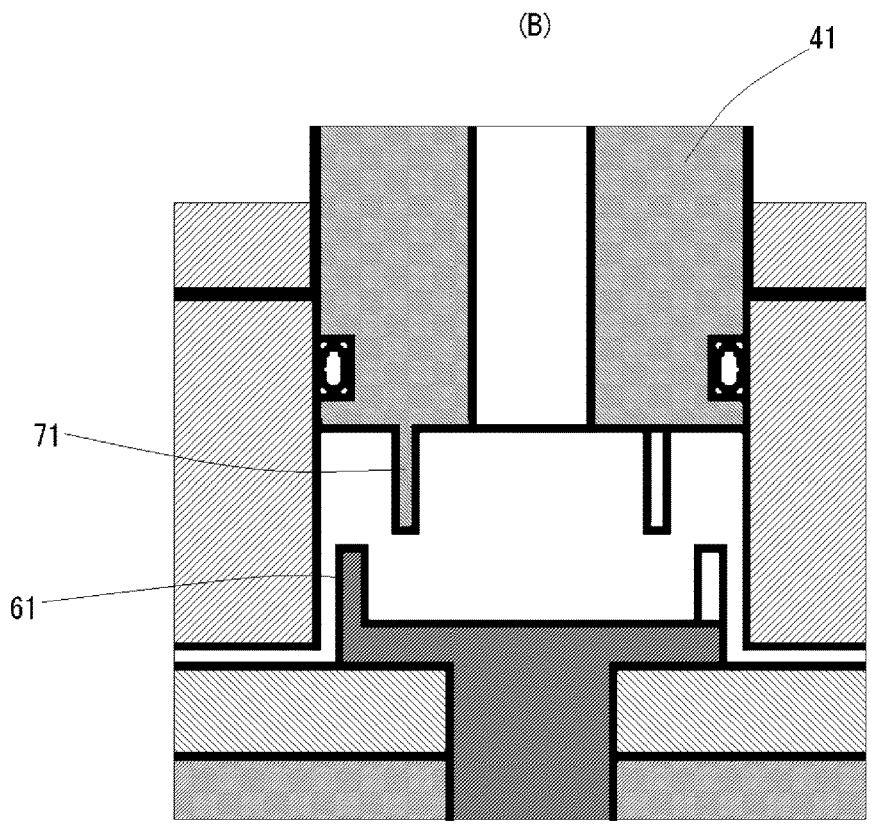
Figure 5:
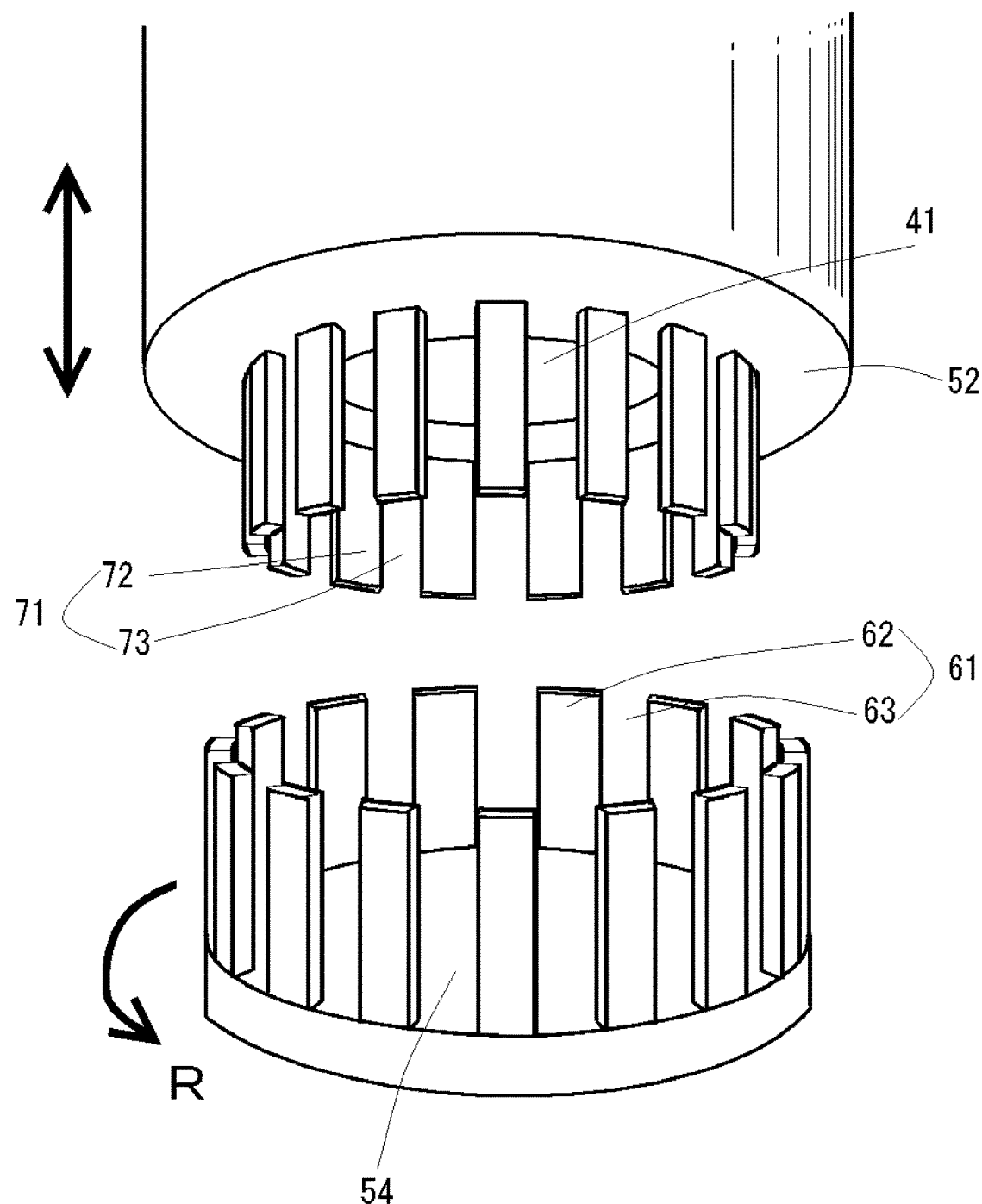
Figure 6:
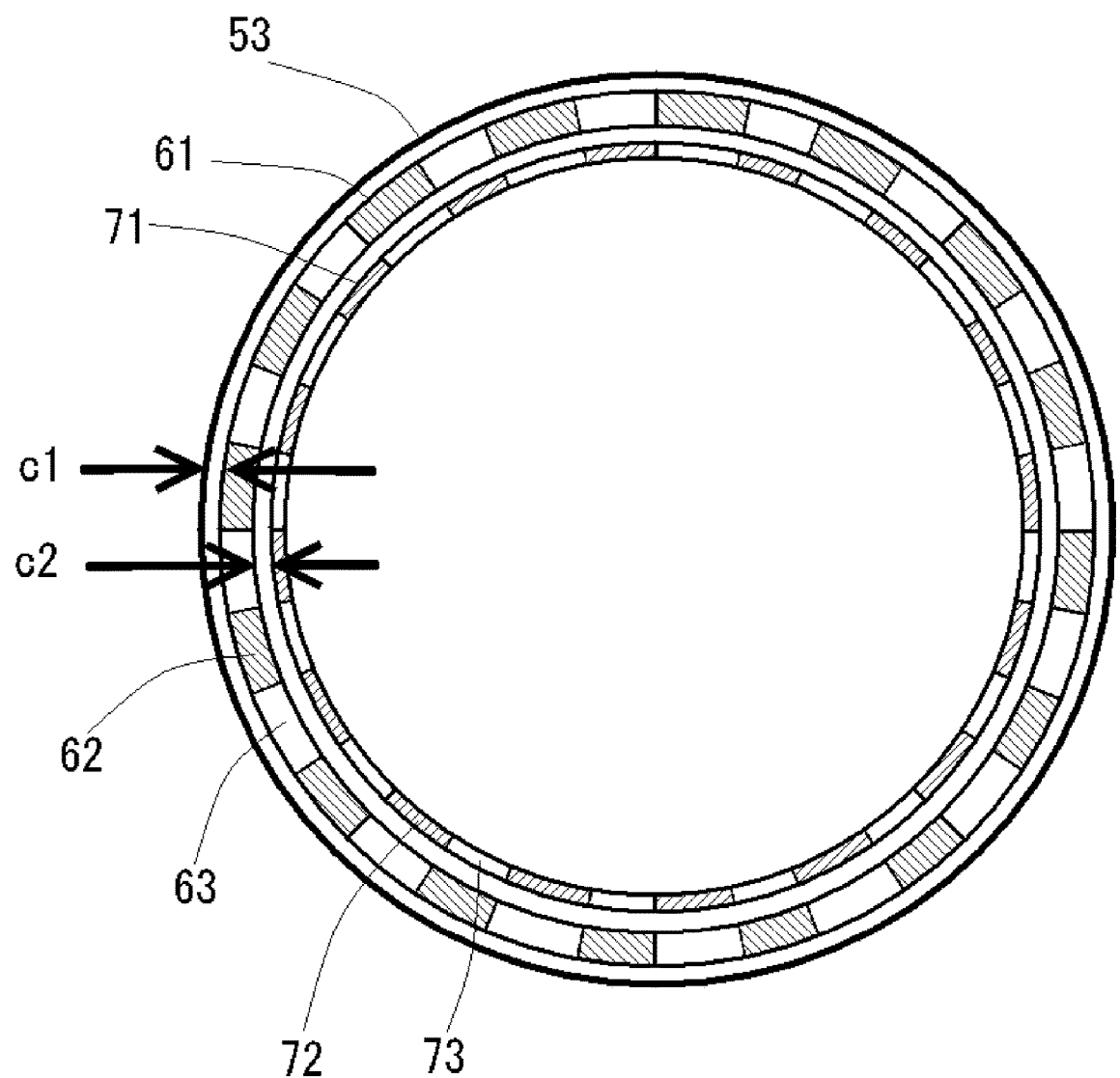

The stirring space 51 is a cylindrical space defined by the ceiling wall 52, the side wall 53, and the bottom wall 54, as depicted in FIG. 4, which is an enlarged drawing of FIG. 1. In this embodiment, the ceiling wall 52 is a lower surface of the central part 41, the side wall 53 is an inner circumferential surface of the second processing member 20, and the bottom wall 54 is an upper surface of the rotor 61, wherein they may be variously modified. For example, the central part 41 and the second processing member 20 are formed separately; however, in the case where the screen 71 is not disposed, or the central part 41 and the screen 71 are formed separately, the central part 41 and the second processing member 20 may be formed integrally, and in this case, the lower surface of the second processing member 20 constitutes the ceiling wall 52. When the position of the stirring space 51 is lowered, the inner circumferential surfaces of the second processing member 20 and of the first processing member 10, or only the inner circumferential surface of the first processing surface 10 constitutes the side wall 53. When the base portion of the rotor 61 is not made to a disc-like shape, the upper face of the first processing member 10 constitutes the bottom wall 54. In addition, when the shape of the rotor 61 or of the screen 71 changes, the shape of the stirring space 51 may also be altered in accordance with this change.

(With Regard to the Stirring Blade)

The stirring blade 62 may be carried out with various embodiments capable of giving the shear force to the first fluid. In this embodiment, plural comb-like stirring blades are extended to the axial direction (in the figure, the vertical direction) in the outer circumference of the disc-like rotor 61. The stirring blade 62 is formed concentrically along the circumferential direction, and the slit 63 is formed between the stirring blade 62 and the stirring blade 62.

The rotor 61 is fixed to the first processing member 10 thereby rotating with the first processing member 10 and the first holder 11 by means of the rotation driving mechanism M. However, the rotation speed thereof is slower as compared with a high-speed rotation stirrer, so that it is difficult to fully perform the function thereof. Therefore, in order to effectively act to the first fluid by co-work with the stirring space 51 (especially with the cylindrical wall 53), the outer circumference edge of the stirring blades 62 is extended parallel in the axial direction with keeping a prescribed clearance c1 to the side wall 53. As a result, not only the stirring energy is merely given to the first fluid by the stirring blade 62 but also the first fluid immediately after being stirred collides to the side wall 53, so that not only a further larger force can be given to the first fluid but also adhesion or deposition in between the rotor 61 and the side wall 53 can be suppressed depending on the type of the first fluid.

In the case where the clearance c1 is wider than 1 mm, it is difficult to cause the first fluid effectively collide to the side wall 53; and in addition, there is a case that to suppress adhesion or deposition of part of the components in the first fluid is difficult. In the case where the clearance c1 is narrower than 0.2 mm, there is a possibility that the stirring blade 62 contacts to the side wall 53. Accordingly, the clearance c1 is adjusted preferably within the range of 0.2 mm to 1 mm.

Meanwhile, if complication of the apparatus structure is acceptable, the embodiment in which the rotor 61 is made to rotate independently from the first processing member 10 may be employed.

(With Regard to the Screen)

The screen 71 is disposed in an inner circumference side of the stirring blades 62. The screen 71 is cylindrical, wherein plural comb-like screen members 72 are disposed along the circumferential direction with the slit 73 interposed between them. The screen members 72 are formed concentrically with the stirring blades 62 along the circumferential direction with the same axis.

In this example, the screen member 72 is extended downward from the lower surface of the central part 41, wherein it is overlapped with the stirring blade 62 in the radius direction. By so doing, the shear force is given to the fluid between the screen member 72 and the stirring blade 62.

When the clearance c2 between the stirring blade 62 and the screen member 72 is made to 1 mm or less, mixing, dispersion, and stirring can be effectively carried out. In the case where c2 is more than 1 mm, effect of the shear force decreases, while in the case of 0.2 mm or less, there is a chance that the stirring blade 62 contacts to the screen member 72, so that adjustment thereof is difficult. Accordingly, the clearance c2 is also adjusted preferably within the range of 0.2 mm to 1 mm.

(Movement of the Screen in the Axial Direction)

It is preferable to freely move the screen 71 in the axial direction so as to be able to adjust the setting position thereof (see, FIGS. 4(A) and 4(B)).

In this example, the whole of the central part 41 having the screen 71 underneath thereof is configured so as to be moved by means of the position adjusting mechanism 42 that is depicted in FIG. 1. Specific composition of the position adjusting mechanism 42 is not particularly restricted, so that a transfer means in a linear fashion such as a transfer mechanism with a screw or with a fluid pressure driving mechanism driven by an air pressure, an oil pressure, or the like may be employed.

Alternatively, the screen 71 and the central part 41 may be separately configured so as to move only the screen 71.

Because the position of the screen 71 can be set at a target height, by adjusting the position of the screen 71 in accordance with a necessary shear force, the shear force can be freely adjusted. In the case when a high shear force is needed, the screen is set at a low position so as to increase the overlapping part with the stirring blade 62 (FIG. 4(A)). On the other hand, in the case when the required shear force is small so that stirring is carried out in order to obtain a comparatively small shear force, the screen 71 is moved to the position where it does not overlap with the central part 41 (FIG. 4(B)). By so doing, a substance such as a polymer in which decrease in the molecular weight thereof needs to be avoided and a substance having a large particle diameter of the agglomerate thereof can be processed by the same apparatus; and thus, this is useful.

In addition, when the movement of the screen 71 is stopped halfway, the overlapping ratio with the central part 41 can be freely changed.

(Material)

Materials of the rotor 61 and of the screen 71 are not particularly restricted; illustrative example which can be employed therein includes metals or sintered metals such as stainless steel, hastelloy, Inconel, and titanium; ceramics such as abrasion-resistant steel, alumina, SiC, super-hard material (WC), SiN, and sapphire; carbon or other metals subjected to hardening treatment; and hard materials subjected to lining, coating, or plating. For the stirring blade 62 and the screen member 72, materials which are different from those of other parts may be selected. Illustrative example of the material other than those mentioned above includes glasses such as silicate glass and quartz glass; polytetrafluoroethylene, ABS, polyethylene, and polypropylene; acryl resins such as PMMA; polycarbonate; fluorinated resins such as PTFE and PFA; and epoxy resins.

Alteration Examples

Figure 7:
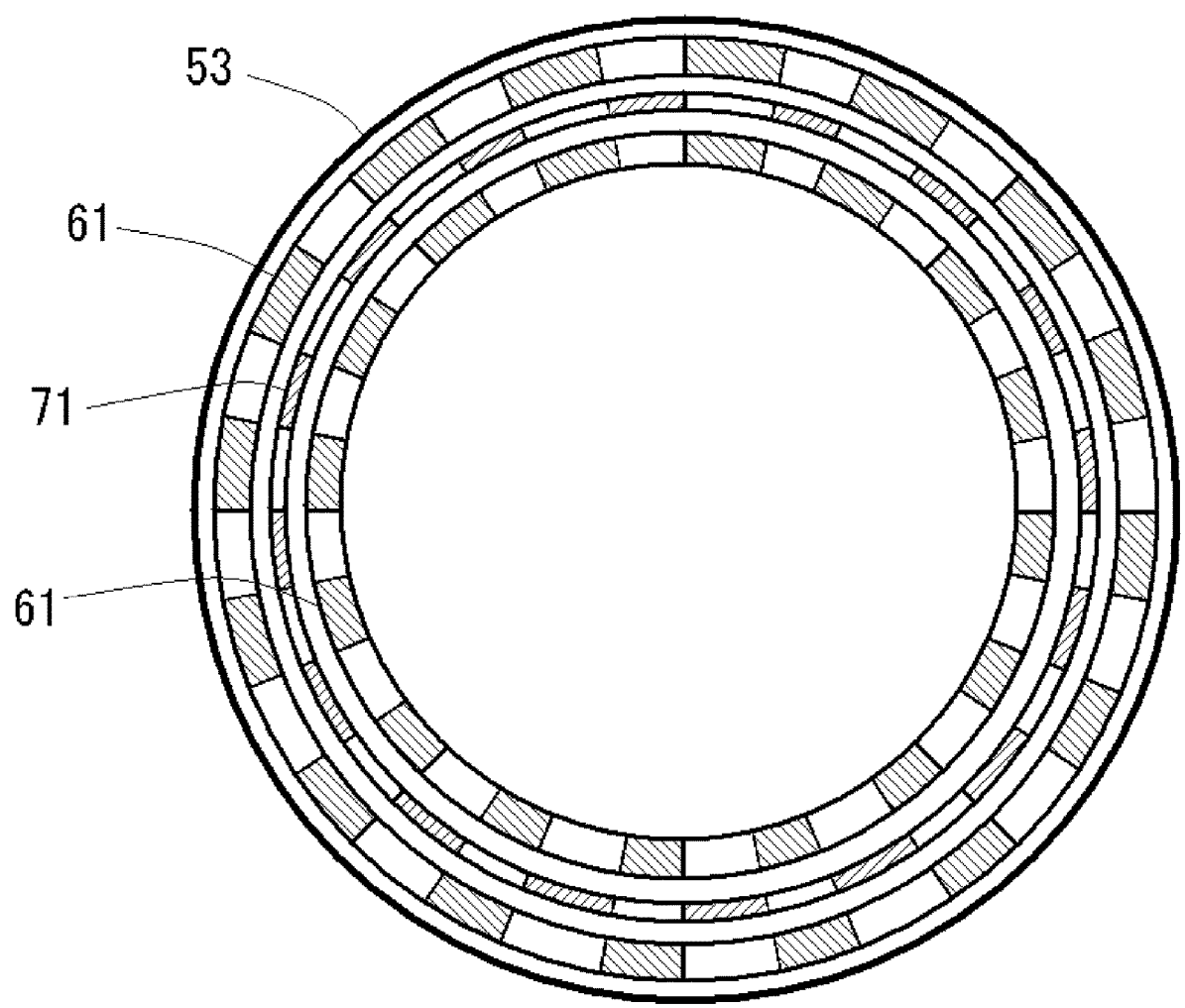

The screen 71 and the rotor 61 may also be disposed in plural stages if necessary. In FIG. 7, the stirring blade 62 of the rotor 61 is dually disposed in such a way that the screen 71 is disposed between both the stirring blades 62. Although not depicted in drawings, not only the screen 71 can be disposed in plural stages but also the stirring blade 62 may be disposed in three or more stages. Disposition of them in plural stages as described above is suitable for further increase in the shear force and for the control thereof. When plural stages are employed, it is preferable to adjust the clearance between the screen member 72 and the stirring blade 62 similarly to those described before.

The shape of the stirring blade 62 of the rotor 61 may be comb-like, saw-like, or the like; and in addition, a screw-like shape may be used. In any of them, it is preferable that the stirring blade 62 is extended in an axial direction as mentioned before and that the first fluid collides to the side wall 53.

Alternatively, the rotor 61 and the screen 71 may change the inside and outside positions with each other. However, in this case, when the screen 71 is moved in an axial direction, there is a risk of an excessively large clearance between the stirring blade 62 and the side wall 53.

The slits 63 and 73 of the rotor 61 and of the screen 71 having open ends are depicted; however, the ends thereof may not be open but closed, something like punching holes (circular holes, long holes, polygonal holes, etc.).

Alternatively, in place of the screen 71 or together with it, an independent adjusting means with which the fluid processing capacity in the stirring space 51 can be adjusted independently from the rotation number of the first processing surface 1 by changing, for example, the flow rate of the fluid to be processed going toward the stirring blade 62, may be employed, wherein illustrative example thereof includes a baffle plate having no holes, a baffle plate having large openings or various sized openings, a sliding plate with which the opening degree of the openings of the baffle plate can be adjusted, and a net-like body. By changing the position of these independent adjusting means including the screen 71 in a similar manner to the screen 71 as described before, the fluid processing capacity in the stirring space 51 can be adjusted independently from the rotation number of the first processing member 10 even if the processing capacity of the stirring blade 62 itself changes with the change of the rotation number of the first processing member 10.

Meanwhile, it is preferable that the immediately-before stirring is carried out also in the second fluid; however, the flow rate of the second fluid is generally smaller than that of the first fluid, so that it is not essential to carry out the immediately-before stirring in the second fluid.

It is also possible to have two or more of the flow path to the stirring space 51. In this case, it is also possible to dispose two or more first fluid preparation systems 101 that are used for preparation of the fluids to be processed which become the first fluid. In this case, two or more of the first introduction parts d1 may be formed in the central part 41. This embodiment can be suitably used for the raw material susceptible to a temporal change when it is mixed in advance, namely this is suitably used for the fluid which is better to be mixed immediately before the reaction.

(Fluid Processing of this System)

Accordingly, in the above-mentioned system, the fluid processing is carried out as follows.

In the fluid preparation system P, the preliminary preparation steps are carried out in order to prepare the fluids to be processed. Specifically, to each of the fluids to be processed before being fed to the fluid processing apparatus F, the preparation processing step in which the mixing state or the dissolution state thereof is made to an ideal state by the first fluid preparation apparatus 102 or the second fluid preparation apparatus 202, as well as the temperature adjusting step in which the temperature thereof is adjusted by the first fluid temperature adjusting apparatus 103 or the second fluid temperature adjusting apparatus 203 is carried out.

The fluids to be processed each of which is prepared to an ideal state by the preliminary preparation steps including the preparation processing step and the temperature adjusting step are continuously fed into the fluid processing apparatus F.

The immediately-before stirring step is carried out in the stirring space 51 to at least the first fluid before it is introduced into the circular flow path 3 so as to carry out the reaction treatment in the fluid processing apparatus F.

By so doing, a stirring energy is given to the fluid to be processed so that the ideal state of the fluid to be processed, this state being in the course of being lost before introduction into the circular flow path 3, is recovered or preferably brought to a more ideal state, and then it is introduced into the circular flow path 3.

It is suitable that the fluid is introduced from the stirring space 51 directly into the circular flow path 3 without going through other flow path after the stirring treatment is carried out with the stirring blade 61 and the screen 71 which is optionally disposed; and it is preferable that the introduction into the circular flow path 3 is carried out within 1 second after the stirring treatment is carried out.

The fluid to be processed having been made to the ideal state is immediately introduced into the circular flow path 3; and because it goes through the circular flow path 3 under the state of a laminar flow, a homogeneous reaction can be realized. Accordingly, excellent effects can be expressed, such as, for example, microparticles having uniform particle diameter can be obtained in the case of the reaction accompanied with separation of the microparticles.

Especially in the case where the second fluid is made to join to the first fluid under the state of a laminar flow whereby carrying out mixing and reaction of the fluids to be processed by the molecular dispersion under the state of a laminar flow, homogeneity of the reaction result is significantly influenced by the homogeneity in the condition of these fluids, so that the system of the present invention is effective in the point to satisfy this condition.

(Types of the Fluid and Reaction)

The present system and the fluid processing method by the present system can be applied to various fluids to be processed that are described in Patent Document 4; and thus, they can be applied to various reactions.

For example, in the case where plural fluids are mixed and then this mixture is fed into between the processing surfaces as the first fluid to be processed, the fluids to be mixed are not particularly restricted. For example, when a fluid including a substance with high viscosity or a substance with high consistency is included in one of the fluids to be processed is mixed, or when an inorganic substance such as an oxide, a metal, a ceramic, a semiconductor, or a silica, or an organic substance such as a pigment or a chemical is introduced into between the processing surfaces, the present invention is effective. In many cases, these substances form aggregates because they are fine, so that it is hoped that the introduction thereof into between the processing surfaces is carried out under the uniform state without concentration distribution thereof. In addition, as in the case of water and oil, emulsification and dispersion treatments can be carried out simultaneously with mixing. In the case of dissolution, for example, when a polymer such as cellulose or hyaluronic acid is dissolved into water by using a general tank or a general stirrer, concentration distribution or viscosity distribution is generated thereby making the dissolution thereof difficult; however, even in such a case, the dissolution treatment thereof can be carried out uniformly without irregularity in the concentration. In addition, even in the case of organic synthesis where decomposition or heat generation can take place when mixing is carried out in advance, by introducing the substance which can easily generate by-products immediately before the generation thereof, the reaction can take place instantaneously.

EXAMPLES

Hereinafter, in order to help understanding of the present invention furthermore, Examples are described; however, it should not be understood that the present invention is limited to these Examples.

Example 1

As the first fluid, the mixed solution of zinc oxide agglomerates with the size of about several micrometers formed of primary particles with the diameter of 20 nm, sodium carbonate, and pure water, with the ratio thereof being 0.1/2.0/97.9% by weight, was prepared in the first fluid preparation apparatus 102 of the fluid preparation system P; and after the temperature of the mixed solution was adjusted at 25° C. in the first fluid temperature adjusting apparatus 103, this solution was fed to the fluid processing apparatus F with keeping the temperature thereof.

As the second fluid, the mixed solution of tetraethyl o-silicate, hydrochloric acid, and pure water with the ratio thereof being 0.9/0.14/98.96% by weight was prepared in the second fluid preparation apparatus 202 of the fluid preparation system P; and after the temperature of the mixed solution was adjusted at 25° C. in the second fluid temperature adjusting apparatus 203, this solution was fed to the fluid processing apparatus F with keeping the temperature thereof.

After the first fluid was subjected to the immediately-before stirring treatment in the stirring space 51 provided with the rotor 61 and the screen 71 in the fluid processing apparatus F, this fluid was introduced from the first introduction port d10 into the circular flow path 3 between the processing surfaces 1 and 2 at the flow rate of 600 mL/min.

Major conditions of the fluid processing apparatus F were as follows.
Outer diameter of the stirring blade 62: 40 mm
Circumferential rotation speed at the outer circumference of the stirring blade 62: 2.33 m/sec
Number of the stirring blade 62: 14
Height of the stirring blade 62 (length in the axial direction): 10
Ratio of the lengths of the stirring blade 62 to the slit 63 in the circumferential direction: 1/1
Clearance c1 between the stirring blade 62 and the side wall 53: 1 mm
Clearance c2 between the stirring blade 62 and the screen member 72: 1 mm
Outer diameter of the second processing surface 2: 100 mm
Circumferential rotation speed at the outer circumference of the second processing surface 2: 5.83 m/sec The second fluid was introduced to the first fluid which was made to the thin film fluid in the circular flow path 3 of the fluid processing apparatus F. With regard to this second fluid, it was introduced from the second introduction port d20 into the circular flow path 3 between the processing surfaces 1 and 2 at the flow rate of 30 mL/min without being subjected to the immediately-before stirring treatment.

After the first fluid and the second fluid were caused to react with each other in between the first and second processing surfaces 1 and 2, the fluid to be processed that was discharged from between the processing surfaces 1 and 2 was subjected to the prescribed post-treatment, and then, the particles separated in the fluid to be processed were confirmed. It was confirmed by the TEM observation that microparticles having around the zinc oxide particles therein uniformly covered with the silica composition with the thickness of about 1.2 nm were obtained, wherein the zinc oxide particles were not agglomerated, but each of them was a single particle having the average particle diameter of 20 nm. There was no deposited zinc oxide observed at the first introduction port d10.

Example 2

The fluids to be processed under the same conditions as Example 1 were caused to react in the fluid processing apparatus F. The reaction treatment was carried out with the same treatment conditions as those in the fluid preparation system P and the fluid processing apparatus F except that both the clearance c1 and the clearance c2 were made to 2 mm; and then, the microparticles thereby obtained were confirmed. From the TEM observation result, it was confirmed that part of the agglomerates were covered with the silica composition. The particle diameter of the obtained particles after having been covered was in the range of about 20 nm to about 200 nm, so that it was confirmed that there was a comparatively larger distribution in the particle diameter thereof as compared with Example 1. Similarly to Example 1, there was no deposited zinc oxide observed at the first introduction port d10.

Comparative Example

When the fluids to be processed under the same conditions as Example 1 were caused to react in the fluid processing apparatus not disposed with the stirring blade and the screen, it was confirmed from the TEM observation that the particles covered with the silica composition around the agglomerated particles thereof were separated. It was confirmed that the particle diameter of the obtained particles after having been covered was in the range of about 100 nm to about 1 μm, so that there was a larger distribution in the particle diameter as compared even with Example 2. In addition, it was confirmed that deposition of zinc oxide occurred at the first introduction port.

Example 3

As the first fluid, the mixed solution of hydroxypropyl methyl cellulose and pure water with the ratio thereof being 0.5/99.5% by weight was prepared in the first fluid preparation apparatus 102 of the fluid preparation system P; and after the temperature of the mixed solution was adjusted at 40° C. in the first fluid temperature adjusting apparatus 103, this solution was fed to the same fluid processing apparatus F as that used in Example 1 with keeping the temperature thereof.

With regard to the first fluid, the immediately-before stirring treatment was carried out in the stirring space 51 provided with the rotor 61 and the screen 71 in the fluid processing apparatus F.

However, the immediately-before stirring treatment was carried out by raising the screen 71 up to the position not overlapping with the rotor 61. The clearance c1 of 1 mm was used.

After the immediately-before stirring treatment, the first fluid was introduced from the first introduction port d10 into the circular flow path 3 between the processing surfaces 1 and 2 with the flow rate of 90 mL/min. The circumferential velocity of the stirring blade was made to 4.4 m/sec.

As the second fluid, the mixed solution of curcumin and ethanol with the ratio thereof being 1.0/99.0% by weight was prepared in the second fluid preparation apparatus 202 of the fluid preparation system P; and after the temperature of the mixed solution was adjusted at 40° C. in the second fluid temperature adjusting apparatus 203, this solution was fed to the fluid processing apparatus F with keeping the temperature thereof.

The second fluid was introduced from the second introduction port d20 to the circular flow path 3 between the processing surfaces 1 and at the flow rate of 50 mL/min without carrying out the immediately-before stirring treatment.

After the first fluid and the second fluid were caused to react with each other in between the first and second processing surfaces 1 and 2 of the fluid processing apparatus F, the fluid to be processed that was discharged from between the processing surfaces 1 and 2 was subjected to the prescribed post-treatment, and then, the curcumin microparticles separated in the fluid to be processed were subjected to the TEM observation. It was confirmed that particles having the particle diameter of about 100 nm were uniformly formed.

Example 4

Example 4 was carried out using the same raw materials and with the same treatment method as those of Example 3.

However, the screen 71 was lowered to the position where it was overlapped with the rotor 61, and then, the immediately-before stirring treatment was carried out.

Both the clearance c1 and the clearance c2 were made to 1 mm.

The TEM observation was carried out with regard to the curcumin microparticles thus obtained; and it was found that the particle diameter distribution thereof was in the range of about 20 nm to about 300 nm, and thus, it was confirmed that the width of the distribution was broadened.

In conclusion, contrary to Comparative Example, in Examples 1 and 2, the fluids to be processed could be introduced into the circular flow path without problems. On top of it, the reaction in the fluid processing apparatus F could be uniformly carried out; and as a result, it was confirmed that uniformity of the separated microparticles was enhanced. In Example 1 in which the clearance c1 and the clearance c2 were made narrower as compared with Example 2, it was confirmed that uniformity of the microparticles could be further enhanced.

In addition, as can be seen in Example 1, good results can be occasionally obtained by co-using the stirring blade and the screen. As apparent from comparison between Example 3 and 4, it was also confirmed that better results can be occasionally obtained when the screen is not co-used. Accordingly, superiority of the treatment in which the position of the screen is adjusted in accordance with the type or the like of the fluid to be process was confirmed.

EXPLANATION OF THE SYMBOLS

1 First processing surface
2 Second processing surface
3 Circular flow path
10 First processing member
11 First holder
13 Depression
16 Flat plane
20 Second processing member
21 Second holder
22 Storing member
23 Spring
31 Rotation axis
41 Central part
42 Position adjusting mechanism
51 Stirring space
52 Ceiling wall
53 Side wall
54 Bottom wall
61 Rotor
62 Stirring blade
63 Slit
71 Screen
72 Screen member
73 Slit
101 First fluid preparation system
102 First fluid preparation apparatus
103 First fluid temperature adjusting apparatus
104 First fluid pressure imparting mechanism
201 Second fluid preparation system
202 Second fluid preparation apparatus
203 Second fluid temperature adjusting apparatus
204 Second fluid pressure imparting mechanism
F Fluid processing apparatus
M Rotation driving mechanism
P Fluid preparation system
R Rotation direction
c1 and c2 Clearance
d1 First introduction part
d10 First introduction port
d2 Second introduction part
d20 Second introduction port

The invention claimed is:

1. An immediately-before-stirring-type fluid processing apparatus, wherein the apparatus comprises:
at least two processing surfaces disposed in a position facing each other; and
a rotating mechanism which rotates at least one of the at least two processing surfaces relative to the other of the at least two processing surfaces,
wherein the fluid processing apparatus is configured such that the at least two processing surfaces define a circular flow path through which a fluid to be processed passes, and such that fluid processing of the fluid to be processed can be carried out between the at least two processing surfaces when the fluid to be processed under a state of being in a thin film fluid passes through the circular flow path from an inner side to an outer side in a radius direction thereof,
wherein a cylindrical stirring space is arranged in an inner side of the circular flow path in a radius direction,
wherein a stirring blade and a screen are disposed in the stirring space, and
wherein the apparatus is configured such that a stirring energy is applied to the fluid to be processed immediately before the fluid is introduced into the circular flow path by means of the stirring blade and at the same time a shear force is applied to the fluid to be processed between the stirring blade and the screen.

2. The immediately-before-stirring-type fluid processing apparatus according to claim 1, wherein the apparatus has a position adjusting mechanism with which a position of the screen is made changeable in order to control the shear force to the fluid to be processed.

3. The immediately-before-stirring-type fluid processing apparatus according to claim 1, wherein the stirring blade is disposed between the screen and a wall which defines the stirring space, and the shear force is given to the fluid to be processed between the screen and the stirring blade, and the fluid to be processed applied with the stirring energy by means of the stirring blade collides to the wall.

4. The immediately-before-stirring-type fluid processing apparatus according to claim 1, wherein the screen is disposed concentrically with the stirring blade inside the stirring blade along a circumferential direction, and is provided with plural slits in the circumferential direction thereof.

5. The immediately-before-stirring-type fluid processing apparatus according to claim 1, wherein a clearance between the stirring blade and the screen is 1 mm or less.

6. The immediately-before-stirring-type fluid processing apparatus according to claim 3, wherein a clearance between the stirring blade and the wall is 1 mm or less.

7. The immediately-before-stirring-type fluid processing apparatus according to claim 1,
wherein the circular flow path thereof is provided with at least two introduction ports,
wherein one introduction port is open to the circular flow path from the stirring space thereby introducing thereto a first fluid immediately after having been stirred by the stirring blade from an inner side of the circular flow path, and
wherein another introduction port is open to a midway of the circular flow path thereby making a second fluid join to the first fluid which has been made to a thin film fluid forced by the processing surfaces.

8. The immediately-before-stirring-type fluid processing apparatus according to claim 1, wherein the apparatus is configured such that a distance between the processing surfaces is controlled by a balance between a pressure of the fluid to be processed which acts to a separating direction in an axial direction of a rotation of the rotating mechanism and a force applied so as to make the processing surfaces approach in the axial direction of the rotation.

9. An immediately-before-stirring-type fluid processing apparatus, wherein the apparatus comprises:
at least two processing surfaces disposed in a position facing each other; and
a rotating mechanism which rotates at least one of the at least two processing surfaces relative to the other of the at least two processing surfaces,
wherein the fluid processing apparatus configured such that the at least two processing surfaces define a circular flow path through which a fluid to be processed passes, and such that fluid processing of the fluid to be processed can be carried out between the at least two processing surfaces when the fluid to be processed under a state of being in a thin film fluid passes through the circular flow path from an inner side to an outer side in a radius direction thereof,
wherein a cylindrical stirring space is arranged in an inner side of the circular flow path in a radius direction,
wherein a stirring blade and an independent adjusting device are disposed in the stirring space,
wherein the stirring blade rotates together with the at least one of the processing surfaces,
wherein the independent adjusting device is disposed so as to be movable against the stirring blade, and
wherein by moving the independent adjusting device, a stirring ability to the fluid to be processed in the stirring space changes independently from a rotation number of the at least one of the processing surfaces.

10. An immediately-before-stirring-type fluid processing method using the immediately-before-stirring-type fluid processing apparatus according to claim 1, said method comprising directly introducing at least one fluid that constitutes the fluid to be processed into the circular flow path from the stirring space without passing through any other flow path after the fluid is subjected to the stirring treatment by the stirring blade.

11. An immediately-before-stirring-type fluid processing method using the immediately-before-stirring-type fluid processing apparatus according to claim 1, said method comprising the step of introducing at least one fluid that constitutes the fluid to be processed into the circular flow path within 1 second after the fluid is subjected to the stirring treatment with the stirring blade.

12. An immediately-before-stirring-type fluid processing method, comprising the steps of:
using a fluid processing apparatus in which at least one of at least two processing surfaces that are disposed in a position facing each other rotates relative to the other of the at least two processing surfaces with a rotation number of 6000 rpm or less;
introducing a fluid to be processed into a circular flow path defined by the at least two processing surfaces;
passing the fluid to be processed that is made to a thin film fluid between the at least two processing surfaces through the circular flow path from an inside to an outside in a radius direction thereof, thereby carrying out a reaction treatment in the thin film fluid;
to the fluid to be processed that is before being introduced into the fluid processing apparatus, carrying out preliminary adjusting steps including a preparation step to adjust a mixing and dissolution state thereof and a temperature adjusting step to adjust a temperature thereof;
feeding the fluid to be processed after having been subjected to the preliminary adjusting steps into the fluid processing apparatus;
carrying out an immediately-before-stirring-step before the reaction treatment in the fluid processing apparatus;
in the immediately-before-stirring-step, disposing a stirring blade in a cylindrical stirring space disposed in an inner side of the circular flow path in a radius direction thereof, and giving a stirring energy to the fluid to be processed by rotation thereof so as to carry out a stirring treatment to the fluid to be processed that is immediately before being introduced into the circular flow path; and
carrying out the reaction treatment in the thin film fluid that is formed when the fluid to be processed is passing through between the at least two processing surfaces under a laminar flow condition.

13. The immediately-before-stirring-type fluid processing method according to claim 12,
wherein at least two fluids of a first fluid and a second fluid are used as the fluid to be processed,
wherein the circular flow path is made to be provided with at least two introduction ports of a first introduction port and a second introduction port,
wherein the preliminary adjusting steps and the immediately-before-stirring-step are carried out to the first fluid, and then the first fluid is introduced into the circular flow path through the first introduction port which connects the stirring space to the circular flow path thereby forming the thin film fluid whose thickness direction is forced by the processing surfaces in the circular path, and
wherein the second fluid is introduced into between the processing surfaces through the second introduction port which is open to a midway of the circular flow path so as to join the second fluid to the first fluid having been made to the thin film fluid, so that mixing and reaction of the fluids to be processed are carried out by molecular dispersion under the laminar flow condition.

14. The immediately-before-stirring-type fluid processing method according to claim 12,
wherein the stirring blade is unpivotably fixed to a center of a holder which supports and rotates the at least one of the processing surfaces, and thereby rotating the stirring blade and the at least one of the processing surfaces at the same speed of 6000 rpm or less,
wherein an outer circumferential edge of the stirring blade is made to extend to an axial direction of rotation of the stirring blade, and is disposed with a clearance of 1 mm or less to a wall which defines a side surface of the stirring space, and
wherein after a stirring energy is given to the fluid to be processed by the stirring blade, the fluid to be processed is made to collide to the wall.

15. The immediately-before-stirring-type fluid processing apparatus according to claim 2, wherein the stirring blade is disposed between the screen and a wall which defines the stirring space, and the shear force is given to the fluid to be processed between the screen and the stirring blade, and the fluid to be processed applied with the stirring energy by means of the stirring blade collides to the wall.

16. The immediately-before-stirring-type fluid processing apparatus according to claim 2, wherein the screen is disposed concentrically with the stirring blade inside the stirring blade along a circumferential direction, and is provided with plural slits in the circumferential direction thereof.

17. The immediately-before-stirring-type fluid processing apparatus according to claim 3, wherein the screen is disposed concentrically with the stirring blade inside the stirring blade along a circumferential direction, and is provided with plural slits in the circumferential direction thereof.

18. The immediately-before-stirring-type fluid processing apparatus according to claim 2, wherein a clearance between the stirring blade and the screen is 1 mm or less.

19. The immediately-before-stirring-type fluid processing apparatus according to claim 3, wherein a clearance between the stirring blade and the screen is 1 mm or less.

20. The immediately-before-stirring-type fluid processing apparatus according to claim 4, wherein a clearance between the stirring blade and the screen is 1 mm or less.

* * * * *